US012056971B1

(12) United States Patent
Morris

(10) Patent No.: US 12,056,971 B1
(45) Date of Patent: Aug. 6, 2024

(54) NETWORK-BASED CONTROL OF MOVABLE BARRIER OPERATORS FOR AUTONOMOUS VEHICLES

(71) Applicant: The Chamberlain Group LLC, Oak Brook, IL (US)

(72) Inventor: David R. Morris, Glenview, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

(21) Appl. No.: 18/242,501

(22) Filed: Sep. 5, 2023

Related U.S. Application Data

(63) Continuation of application No. 17/384,149, filed on Jul. 23, 2021, now Pat. No. 11,763,616, which is a
(Continued)

(51) Int. Cl.
*G07C 9/00* (2020.01)
*B60W 50/00* (2006.01)
(Continued)

(52) U.S. Cl.
CPC ......... *G07C 9/00896* (2013.01); *B60W 50/00* (2013.01); *G05D 1/0276* (2013.01);
(Continued)

(58) Field of Classification Search
None
See application file for complete search history.

(56) References Cited

U.S. PATENT DOCUMENTS

| 29,525 A | 8/1860 | Sherman |
| 30,957 A | 12/1860 | Campbell |
| (Continued) | | |

FOREIGN PATENT DOCUMENTS

| AU | 645228 | 2/1992 |
| AU | 710682 | 11/1996 |
| (Continued) | | |

OTHER PUBLICATIONS

US 7,902,994 B2, 03/2011, Geerlings (withdrawn)
(Continued)

*Primary Examiner* — K. Wong
(74) *Attorney, Agent, or Firm* — Dority & Manning, P.A.

(57) ABSTRACT

The present disclosure generally relates to a system and method for enabling on-demand, temporary storage of an autonomous vehicle in vehicle storage areas of existing infrastructures. The vehicle storage areas include one or more movable barrier operators configured to control access to the vehicle storage areas via movable barriers. An autonomous vehicle access control platform is configured to enable access to individual ones of the vehicle storage areas by a single-use access credential sent to at least one of the autonomous vehicle and one of the movable barrier operators. The autonomous vehicle access control platform communicates with a transportation-as-a-service (TaaS) platform that pairs an autonomous vehicle with a vehicle storage area for storage based at least on a factor or parameter including the location of the vehicle storage area relative to the autonomous vehicle.

20 Claims, 11 Drawing Sheets

Related U.S. Application Data continuation of application No. 16/454,978, filed on Jun. 27, 2019, now Pat. No. 11,074,773.

(60) Provisional application No. 62/690,624, filed on Jun. 27, 2018.

(51) Int. Cl.
  *G05D 1/00* (2006.01)
  *B60L 53/30* (2019.01)
(52) U.S. Cl.
  CPC ...... *B60L 53/30* (2019.02); *B60W 2050/0083* (2013.01); *G07C 2009/00928* (2013.01)

(56) References Cited

U.S. PATENT DOCUMENTS

| | | |
|---|---|---|
| 35,364 A | 5/1862 | Cox |
| 803,047 A | 10/1905 | Browne |
| 2,405,500 A | 8/1946 | Gustav |
| 2,963,270 A | 12/1960 | Magarian |
| 3,716,865 A | 2/1973 | Willmott |
| 3,735,106 A | 5/1973 | Hollaway |
| 3,792,446 A | 2/1974 | McFiggins |
| 3,798,359 A | 3/1974 | Feistel |
| 3,798,360 A | 3/1974 | Feistel |
| 3,798,544 A | 3/1974 | Norman |
| 3,798,605 A | 3/1974 | Feistel |
| 3,845,277 A | 10/1974 | Spetz |
| 3,890,601 A | 6/1975 | Pietrolewicz |
| 3,906,348 A | 9/1975 | Willmott |
| 3,938,091 A | 2/1976 | Atalla |
| 4,037,201 A | 7/1977 | Willmott |
| 4,064,404 A | 12/1977 | Willmott |
| RE29,525 E | 1/1978 | Willmott |
| 4,078,152 A | 3/1978 | Tuckerman |
| 4,097,859 A | 6/1978 | Looschen |
| 4,138,735 A | 2/1979 | Allocca |
| 4,178,549 A | 12/1979 | Ledenbach |
| 4,195,196 A | 3/1980 | Feistel |
| 4,195,200 A | 3/1980 | Feistel |
| 4,196,310 A | 4/1980 | Forman |
| 4,218,738 A | 8/1980 | Matyas |
| 4,243,976 A | 1/1981 | Warner |
| 4,255,742 A | 3/1981 | Gable |
| 4,304,962 A | 12/1981 | Fracassi |
| 4,305,060 A | 12/1981 | Apple |
| 4,316,055 A | 2/1982 | Feistel |
| 4,326,098 A | 4/1982 | Bouricius |
| 4,327,444 A | 4/1982 | Court |
| 4,328,414 A | 5/1982 | Atalla |
| 4,328,540 A | 5/1982 | Matsuoka |
| RE30,957 E | 6/1982 | Feistel |
| 4,380,762 A | 4/1983 | Capasso |
| 4,385,296 A | 5/1983 | Tsubaki |
| 4,387,455 A | 6/1983 | Schwartz |
| 4,387,460 A | 6/1983 | Boutmy |
| 4,393,269 A | 7/1983 | Konheim |
| 4,418,333 A | 11/1983 | Schwarzbach |
| 4,426,637 A | 1/1984 | Apple |
| 4,445,712 A | 5/1984 | Smagala-Romanoff |
| 4,447,890 A | 5/1984 | Duwel |
| 4,454,509 A | 6/1984 | Buennagel |
| 4,464,651 A | 8/1984 | Duhame |
| 4,468,787 A | 8/1984 | Keiper |
| 4,471,493 A | 9/1984 | Schober |
| 4,471,593 A | 9/1984 | Ragland |
| 4,491,774 A | 1/1985 | Schmitz |
| 4,509,093 A | 4/1985 | Stellberger |
| 4,529,980 A | 7/1985 | Liotine |
| 4,535,333 A | 8/1985 | Twardowski |
| 4,566,044 A | 1/1986 | Langdon |
| 4,574,247 A | 3/1986 | Jacob |
| 4,578,530 A | 3/1986 | Zeidler |
| 4,580,111 A | 4/1986 | Swanson |
| 4,581,606 A | 4/1986 | Mallory |
| 4,590,470 A | 5/1986 | Koenig |
| 4,593,155 A | 6/1986 | Hawkins |
| 4,596,898 A | 6/1986 | Pemmaraju |
| 4,596,985 A | 6/1986 | Bongard |
| 4,599,489 A | 7/1986 | Cargile |
| 4,602,357 A | 7/1986 | Yang |
| 4,611,198 A | 9/1986 | Levinson |
| 4,623,887 A | 11/1986 | Welles |
| 4,626,848 A | 12/1986 | Ehlers |
| 4,628,315 A | 12/1986 | Douglas |
| 4,630,035 A | 12/1986 | Stahl |
| 4,633,247 A | 12/1986 | Hegeler |
| 4,638,433 A | 1/1987 | Schindler |
| 4,646,080 A | 2/1987 | Genest |
| 4,652,860 A | 3/1987 | Weishaupt |
| 4,653,076 A | 3/1987 | Jerrim |
| 4,670,746 A | 6/1987 | Taniguchi |
| 4,677,284 A | 6/1987 | Genest |
| 4,686,529 A | 8/1987 | Kleefeldt |
| 4,695,839 A | 9/1987 | Barbu |
| 4,703,359 A | 10/1987 | Rumbolt |
| 4,710,613 A | 12/1987 | Shigenaga |
| 4,716,301 A | 12/1987 | Willmott |
| 4,720,860 A | 1/1988 | Weiss |
| 4,723,121 A | 2/1988 | Van |
| 4,731,575 A | 3/1988 | Sloan |
| 4,737,770 A | 4/1988 | Brunius |
| 4,740,792 A | 4/1988 | Sagey |
| 4,750,118 A | 6/1988 | Heitschel |
| 4,754,255 A | 6/1988 | Sanders |
| 4,755,792 A | 7/1988 | Pezzolo |
| 4,758,835 A | 7/1988 | Rathmann |
| 4,761,808 A | 8/1988 | Howard |
| 4,779,090 A | 10/1988 | Micznik |
| 4,794,268 A | 12/1988 | Nakano |
| 4,794,622 A | 12/1988 | Isaacman |
| 4,796,181 A | 1/1989 | Wiedemer |
| 4,799,061 A | 1/1989 | Abraham |
| 4,800,590 A | 1/1989 | Vaughan |
| 4,802,114 A | 1/1989 | Sogame |
| 4,804,938 A | 2/1989 | Rouse |
| 4,807,052 A | 2/1989 | Amano |
| 4,808,995 A | 2/1989 | Clark |
| 4,825,200 A | 4/1989 | Evans |
| 4,825,210 A | 4/1989 | Bachhuber |
| 4,829,296 A | 5/1989 | Clark |
| 4,831,509 A | 5/1989 | Jones |
| 4,835,407 A | 5/1989 | Kataoka |
| 4,845,491 A | 7/1989 | Fascenda |
| 4,847,614 A | 7/1989 | Keller |
| 4,850,046 A | 7/1989 | Philippe |
| 4,855,713 A | 8/1989 | Brunius |
| 4,856,062 A | 8/1989 | Weiss |
| 4,856,081 A | 8/1989 | Smith |
| 4,859,990 A | 8/1989 | Isaacman |
| 4,870,400 A | 9/1989 | Downs |
| 4,878,052 A | 10/1989 | Schulze |
| 4,881,148 A | 11/1989 | Lambropoulos |
| 4,885,778 A | 12/1989 | Weiss |
| 4,888,575 A | 12/1989 | De Vaulx |
| 4,890,108 A | 12/1989 | Drori |
| 4,893,338 A | 1/1990 | Pastor |
| 4,905,279 A | 2/1990 | Nishio |
| 4,910,750 A | 3/1990 | Fisher |
| 4,912,463 A | 3/1990 | Li |
| 4,914,696 A | 4/1990 | Dudczak |
| 4,918,690 A | 4/1990 | Markkula |
| 4,922,168 A | 5/1990 | Waggamon |
| 4,922,533 A | 5/1990 | Philippe |
| 4,928,098 A | 5/1990 | Dannhaeuser |
| 4,931,789 A | 6/1990 | Pinnow |
| 4,939,792 A | 7/1990 | Urbish |
| 4,942,393 A | 7/1990 | Waraksa |
| 4,951,029 A | 8/1990 | Severson |
| 4,963,876 A | 10/1990 | Sanders |
| 4,979,832 A | 12/1990 | Ritter |
| 4,980,913 A | 12/1990 | Skret |
| 4,988,990 A | 1/1991 | Warrior |

(56) References Cited

U.S. PATENT DOCUMENTS

| | | |
|---|---|---|
| 4,988,992 A | 1/1991 | Heitschel |
| 4,992,783 A | 2/1991 | Zdunek |
| 4,999,622 A | 3/1991 | Amano |
| 5,001,332 A | 3/1991 | Schrenk |
| 5,021,776 A | 6/1991 | Anderson |
| 5,023,908 A | 6/1991 | Weiss |
| 5,049,867 A | 9/1991 | Stouffer |
| 5,055,701 A | 10/1991 | Takeuchi |
| 5,058,161 A | 10/1991 | Weiss |
| 5,060,263 A | 10/1991 | Bosen |
| 5,091,942 A | 2/1992 | Dent |
| 5,103,221 A | 4/1992 | Memmola |
| 5,107,258 A | 4/1992 | Soum |
| 5,126,959 A | 6/1992 | Kurihara |
| 5,136,548 A | 8/1992 | Claar |
| 5,144,667 A | 9/1992 | Pogue |
| 5,146,067 A | 9/1992 | Sloan |
| 5,148,159 A | 9/1992 | Clark |
| 5,150,464 A | 9/1992 | Sidhu |
| 5,153,581 A | 10/1992 | Hazard |
| 5,159,329 A | 10/1992 | Lindmayer |
| 5,168,520 A | 12/1992 | Weiss |
| 5,193,210 A | 3/1993 | Nicholas |
| 5,197,061 A | 3/1993 | Halbert-Lassalle |
| 5,220,263 A | 6/1993 | Onishi |
| 5,224,163 A | 6/1993 | Gasser |
| 5,237,614 A | 8/1993 | Weiss |
| 5,252,960 A | 10/1993 | Duhame |
| 5,278,907 A | 1/1994 | Snyder |
| 5,280,527 A | 1/1994 | Gullman |
| 5,331,325 A | 7/1994 | Miller |
| 5,361,062 A | 11/1994 | Weiss |
| 5,363,448 A | 11/1994 | Koopman |
| 5,365,225 A | 11/1994 | Bachhuber |
| 5,367,572 A | 11/1994 | Weiss |
| 5,369,706 A | 11/1994 | Latka |
| 5,412,379 A | 5/1995 | Waraksa |
| 5,414,418 A | 5/1995 | Andros |
| 5,420,925 A | 5/1995 | Michaels |
| 5,442,340 A | 8/1995 | Dykema |
| 5,442,341 A | 8/1995 | Lambropoulos |
| 5,444,737 A | 8/1995 | Cripps |
| 5,463,376 A | 10/1995 | Stoffer |
| 5,471,668 A | 11/1995 | Soenen |
| 5,473,318 A | 12/1995 | Martel |
| 5,479,512 A | 12/1995 | Weiss |
| 5,485,519 A | 1/1996 | Weiss |
| 5,517,187 A | 5/1996 | Bruwer |
| 5,528,621 A | 6/1996 | Heiman |
| 5,530,697 A | 6/1996 | Watanabe |
| 5,554,977 A | 9/1996 | Jablonski |
| RE35,364 E | 10/1996 | Heitschel |
| 5,563,600 A | 10/1996 | Miyake |
| 5,565,812 A | 10/1996 | Soenen |
| 5,566,359 A | 10/1996 | Corrigan |
| 5,576,701 A | 11/1996 | Heitschel |
| 5,578,999 A | 11/1996 | Matsuzawa |
| 5,594,429 A | 1/1997 | Nakahara |
| 5,596,317 A | 1/1997 | Brinkmeyer |
| 5,598,475 A | 1/1997 | Soenen |
| 5,600,653 A | 2/1997 | Chitre |
| 5,608,723 A | 3/1997 | Felsenstein |
| 5,614,891 A | 3/1997 | Zeinstra |
| 5,635,913 A | 6/1997 | Willmott |
| 5,657,388 A | 8/1997 | Weiss |
| 5,673,017 A | 9/1997 | Dery |
| 5,675,622 A | 10/1997 | Hewitt |
| 5,678,213 A | 10/1997 | Myer |
| 5,680,131 A | 10/1997 | Utz |
| 5,686,904 A | 11/1997 | Bruwer |
| 5,699,065 A | 12/1997 | Murray |
| 5,719,619 A | 2/1998 | Hattori et al. |
| 5,745,068 A | 4/1998 | Takahashi |
| 5,774,065 A | 6/1998 | Mabuchi |
| 5,778,348 A | 7/1998 | Manduley |
| 5,838,747 A | 11/1998 | Matsumoto |
| 5,872,513 A | 2/1999 | Fitzgibbon |
| 5,872,519 A | 2/1999 | Issa |
| 5,898,397 A | 4/1999 | Murray |
| 5,923,758 A | 7/1999 | Khamharn |
| 5,936,999 A | 8/1999 | Keskitalo |
| 5,937,065 A | 8/1999 | Simon |
| 5,942,985 A | 8/1999 | Chin |
| 5,949,349 A | 9/1999 | Farris |
| 5,969,637 A | 10/1999 | Doppelt |
| 6,012,144 A | 1/2000 | Pickett |
| 6,037,858 A | 3/2000 | Seki |
| 6,049,289 A | 4/2000 | Waggamon |
| 6,052,408 A | 4/2000 | Trompower |
| 6,070,154 A | 5/2000 | Tavor |
| 6,094,575 A | 7/2000 | Anderson et al. |
| 6,130,602 A | 10/2000 | O'Toole |
| 6,137,421 A | 10/2000 | Dykema |
| 6,140,938 A | 10/2000 | Flick |
| 6,154,544 A | 11/2000 | Farris |
| 6,157,719 A | 12/2000 | Wasilewski |
| 6,166,650 A | 12/2000 | Bruwer |
| 6,175,312 B1 | 1/2001 | Bruwer |
| 6,181,255 B1 | 1/2001 | Crimmins |
| 6,229,434 B1 | 5/2001 | Knapp |
| 6,243,000 B1 | 6/2001 | Tsui |
| 6,275,519 B1 | 8/2001 | Hendrickson |
| 6,366,051 B1 | 4/2002 | Nantz |
| 6,396,446 B1 | 5/2002 | Walstra |
| 6,414,587 B1 | 7/2002 | Fitzgibbon |
| 6,414,986 B1 | 7/2002 | Usui |
| 6,456,726 B1 | 9/2002 | Yu |
| 6,463,538 B1 | 10/2002 | Elteto |
| 6,496,477 B1 | 12/2002 | Perkins |
| 6,535,544 B1 | 3/2003 | Partyka |
| 6,549,949 B1 | 4/2003 | Bowman-Amuah |
| 6,609,796 B2 | 8/2003 | Maki et al. |
| 6,640,244 B1 | 10/2003 | Bowman-Amuah |
| 6,658,328 B1 | 12/2003 | Alrabady |
| 6,688,518 B1 | 2/2004 | Valencia |
| 6,690,796 B1 | 2/2004 | Farris |
| 6,697,379 B1 | 2/2004 | Jacquet |
| 6,703,941 B1 | 3/2004 | Blaker |
| 6,754,266 B2 | 6/2004 | Bahl |
| 6,778,064 B1 | 8/2004 | Yamasaki |
| 6,810,123 B2 | 10/2004 | Farris |
| 6,829,357 B1 | 12/2004 | Alrabady |
| 6,842,106 B2 | 1/2005 | Hughes |
| 6,850,910 B1 | 2/2005 | Yu |
| 6,861,942 B1 | 3/2005 | Knapp |
| 6,917,801 B2 | 7/2005 | Witte |
| 6,930,983 B2 | 8/2005 | Perkins |
| 6,956,460 B2 | 10/2005 | Tsui |
| 6,963,270 B1 | 11/2005 | Gallagher, III |
| 6,963,561 B1 | 11/2005 | Lahat |
| 6,978,126 B1 | 12/2005 | Blaker |
| 6,980,518 B1 | 12/2005 | Sun |
| 6,980,655 B2 | 12/2005 | Farris |
| 6,988,977 B2 | 2/2006 | Gregori |
| 6,998,977 B2 | 2/2006 | Gregori |
| 7,002,490 B2 | 2/2006 | Lablans |
| 7,039,397 B2 | 5/2006 | Chuey |
| 7,039,809 B1 | 5/2006 | Wankmueller |
| 7,042,363 B2 | 5/2006 | Katrak |
| 7,050,479 B1 | 5/2006 | Kim |
| 7,050,794 B2 | 5/2006 | Chuey et al. |
| 7,057,494 B2 | 6/2006 | Fitzgibbon |
| 7,057,547 B2 | 6/2006 | Olmsted |
| 7,068,181 B2 | 6/2006 | Chuey |
| 7,071,850 B1 | 7/2006 | Fitzgibbon |
| 7,088,218 B2 | 8/2006 | Chuey |
| 7,088,265 B2 | 8/2006 | Tsui |
| 7,088,706 B2 | 8/2006 | Zhang et al. |
| 7,139,398 B2 | 11/2006 | Candelore |
| 7,161,466 B2 | 1/2007 | Chuey |
| 7,205,908 B2 | 4/2007 | Tsui |
| 7,221,256 B2 | 5/2007 | Skekloff |
| 7,257,426 B1 | 8/2007 | Witkowski |
| 7,266,344 B2 | 9/2007 | Rodriquez |

(56) References Cited

U.S. PATENT DOCUMENTS

| | | |
|---|---|---|
| 7,289,014 B2 | 10/2007 | Mullet |
| 7,290,886 B2 | 11/2007 | Cheng |
| 7,298,721 B2 | 11/2007 | Atarashi et al. |
| 7,301,900 B1 | 11/2007 | Laksono |
| 7,332,999 B2 | 2/2008 | Fitzgibbon |
| 7,333,615 B1 | 2/2008 | Jarboe |
| 7,336,787 B2 | 2/2008 | Unger |
| 7,346,163 B2 | 3/2008 | Pedlow |
| 7,346,374 B2 | 3/2008 | Witkowski |
| 7,349,722 B2 | 3/2008 | Witkowski |
| 7,353,499 B2 | 4/2008 | De Jong |
| 7,406,553 B2 | 7/2008 | Edirisooriya et al. |
| 7,412,056 B2 | 8/2008 | Farris |
| 7,415,618 B2 | 8/2008 | De Jong |
| 7,429,898 B2 | 9/2008 | Akiyama |
| 7,447,498 B2 | 11/2008 | Chuey et al. |
| 7,469,129 B2 | 12/2008 | Blaker |
| 7,489,922 B2 | 2/2009 | Chuey |
| 7,492,898 B2 | 2/2009 | Farris et al. |
| 7,492,905 B2 | 2/2009 | Fitzgibbon |
| 7,493,140 B2 | 2/2009 | Michmerhuizen |
| 7,516,325 B2 | 4/2009 | Willey |
| 7,532,965 B2 | 5/2009 | Robillard |
| 7,535,926 B1 | 5/2009 | Deshpande |
| 7,545,942 B2 | 6/2009 | Cohen et al. |
| 7,548,153 B2 | 6/2009 | Gravelle et al. |
| 7,561,075 B2 | 7/2009 | Fitzgibbon |
| 7,564,827 B2 | 7/2009 | Das et al. |
| 7,598,855 B2 | 10/2009 | Scalisi et al. |
| 7,623,663 B2 | 11/2009 | Farris |
| 7,668,125 B2 | 2/2010 | Kadous |
| 7,741,951 B2 | 6/2010 | Fitzgibbon |
| 7,742,501 B2 | 6/2010 | Williams |
| 7,757,021 B2 | 7/2010 | Wenzel |
| 7,764,613 B2 | 7/2010 | Miyake et al. |
| 7,786,843 B2 | 8/2010 | Witkowski |
| 7,812,739 B2 | 10/2010 | Chuey |
| 7,839,263 B2 | 11/2010 | Shearer |
| 7,839,851 B2 | 11/2010 | Kozat |
| 7,855,633 B2 | 12/2010 | Chuey |
| 7,864,070 B2 | 1/2011 | Witkowski |
| 7,889,050 B2 | 2/2011 | Witkowski |
| 7,911,358 B2 | 3/2011 | Bos |
| 7,920,601 B2 | 4/2011 | Andrus |
| 7,970,446 B2 | 6/2011 | Witkowski |
| 7,973,678 B2 | 7/2011 | Petricoin, Jr. |
| 7,979,173 B2 | 7/2011 | Breed |
| 7,999,656 B2 | 8/2011 | Fisher |
| 8,000,667 B2 | 8/2011 | Witkowski |
| 8,014,377 B2 | 9/2011 | Zhang et al. |
| 8,031,047 B2 | 10/2011 | Skekloff |
| 8,049,595 B2 | 11/2011 | Olson |
| 8,103,655 B2 | 1/2012 | Srinivasan |
| 8,111,179 B2 | 2/2012 | Turnbull |
| 8,130,079 B2 | 3/2012 | Mcquaide, Jr. et al. |
| 8,138,883 B2 | 3/2012 | Shearer |
| 8,174,357 B2 | 5/2012 | Geerlings |
| 8,194,856 B2 | 6/2012 | Farris |
| 8,200,214 B2 | 6/2012 | Chutorash |
| 8,207,818 B2 | 6/2012 | Keller, Jr. |
| 8,208,888 B2 | 6/2012 | Chutorash |
| 8,209,550 B2 | 6/2012 | Gehrmann |
| 8,225,094 B2 | 7/2012 | Willey |
| 8,233,625 B2 | 7/2012 | Farris |
| 8,253,528 B2 | 8/2012 | Blaker |
| 8,264,333 B2 | 9/2012 | Blaker |
| 8,266,442 B2 | 9/2012 | Burke |
| 8,276,185 B2 | 9/2012 | Messina et al. |
| 8,284,021 B2 | 10/2012 | Farris et al. |
| 8,290,465 B2 | 10/2012 | Ryu et al. |
| 8,311,490 B2 | 11/2012 | Witkowski |
| 8,330,569 B2 | 12/2012 | Blaker |
| 8,384,513 B2 | 2/2013 | Witkowski |
| 8,384,580 B2 | 2/2013 | Witkowski |
| 8,416,054 B2 | 4/2013 | Fitzgibbon |
| 8,422,667 B2 | 4/2013 | Fitzgibbon |
| 8,452,267 B2 | 5/2013 | Friman |
| 8,463,540 B2 | 6/2013 | Hannah et al. |
| 8,494,547 B2 | 7/2013 | Nigon |
| 8,531,266 B2 | 9/2013 | Shearer |
| 8,536,977 B2 | 9/2013 | Fitzgibbon |
| 8,544,523 B2 | 10/2013 | Mays |
| 8,581,695 B2 | 11/2013 | Carlson et al. |
| 8,615,562 B1 | 12/2013 | Huang et al. |
| 8,633,797 B2 | 1/2014 | Farris et al. |
| 8,634,777 B2 | 1/2014 | Ekbatani et al. |
| 8,634,888 B2 | 1/2014 | Witkowski |
| 8,643,465 B2 | 2/2014 | Fitzgibbon |
| 8,645,708 B2 | 2/2014 | Labaton |
| 8,661,256 B2 | 2/2014 | Willey |
| 8,699,704 B2 | 4/2014 | Liu et al. |
| 8,760,267 B2 | 6/2014 | Bos et al. |
| 8,787,823 B2 | 7/2014 | Justice et al. |
| 8,830,925 B2 | 9/2014 | Kim et al. |
| 8,836,469 B2 | 9/2014 | Fitzgibbon et al. |
| 8,837,608 B2 | 9/2014 | Witkowski |
| 8,843,066 B2 | 9/2014 | Chutorash |
| 8,878,646 B2 | 11/2014 | Chutorash |
| 8,918,244 B2 | 12/2014 | Brzezinski |
| 8,981,898 B2 | 3/2015 | Sims |
| 9,007,168 B2 | 4/2015 | Bos |
| 9,024,801 B2 | 5/2015 | Witkowski |
| 9,082,293 B2 | 7/2015 | Wellman et al. |
| 9,122,254 B2 | 9/2015 | Cate |
| 9,124,424 B2 | 9/2015 | Aldis |
| 9,142,064 B2 | 9/2015 | Muetzel et al. |
| 9,160,408 B2 | 10/2015 | Krohne et al. |
| 9,189,952 B2 | 11/2015 | Chutorash |
| 9,229,905 B1 | 1/2016 | Penilla |
| 9,230,378 B2 | 1/2016 | Chutorash |
| 9,264,085 B2 | 2/2016 | Pilat |
| 9,280,704 B2 | 3/2016 | Lei et al. |
| 9,317,983 B2 | 4/2016 | Ricci |
| 9,318,017 B2 | 4/2016 | Witkowski |
| 9,324,230 B2 | 4/2016 | Chutorash |
| 9,336,637 B2 | 5/2016 | Neil et al. |
| 9,367,978 B2 | 6/2016 | Sullivan |
| 9,370,041 B2 | 6/2016 | Witkowski |
| 9,396,376 B1 | 7/2016 | Narayanaswami |
| 9,396,598 B2 | 7/2016 | Daniel-Wayman |
| 9,413,453 B2 | 8/2016 | Sugitani et al. |
| 9,418,326 B1 | 8/2016 | Narayanaswami |
| 9,430,939 B2 | 8/2016 | Shearer |
| 9,443,422 B2 | 9/2016 | Pilat |
| 9,449,449 B2 | 9/2016 | Evans |
| 9,539,930 B2 | 1/2017 | Geerlings |
| 9,552,723 B2 | 1/2017 | Witkowski |
| 9,576,408 B2 | 2/2017 | Hendricks |
| 9,614,565 B2 | 4/2017 | Pilat |
| 9,620,005 B2 | 4/2017 | Geerlings |
| 9,640,005 B2 | 5/2017 | Geerlings |
| 9,652,907 B2 | 5/2017 | Geerlings |
| 9,652,978 B2 | 5/2017 | Wright |
| 9,679,471 B2 | 6/2017 | Geerlings |
| 9,691,271 B2 | 6/2017 | Geerlings |
| 9,711,039 B2 | 7/2017 | Shearer |
| 9,715,772 B2 | 7/2017 | Bauer |
| 9,715,825 B2 | 7/2017 | Geerlings |
| 9,791,861 B2 | 10/2017 | Keohane |
| 9,811,085 B1 | 11/2017 | Hayes |
| 9,811,958 B1 | 11/2017 | Hall |
| 9,819,498 B2 | 11/2017 | Vuyst |
| 9,836,905 B2 | 12/2017 | Chutorash |
| 9,836,955 B2 | 12/2017 | Papay |
| 9,836,956 B2 | 12/2017 | Shearer |
| 9,858,806 B2 | 1/2018 | Geerlings |
| 9,875,650 B2 | 1/2018 | Witkowski |
| 9,879,466 B1 | 1/2018 | Yu |
| 9,916,769 B2 | 3/2018 | Wright |
| 9,922,548 B2 | 3/2018 | Geerlings |
| 9,947,159 B2 | 4/2018 | Geerlings |
| 9,965,947 B2 | 5/2018 | Geerlings |
| 9,984,516 B2 | 5/2018 | Geerlings |
| 10,008,109 B2 | 6/2018 | Witkowski |

(56) References Cited

U.S. PATENT DOCUMENTS

| | | |
|---|---|---|
| 10,045,183 B2 | 8/2018 | Chutorash |
| 10,062,229 B2 | 8/2018 | Zeinstra |
| 10,096,186 B2 | 10/2018 | Geerlings |
| 10,096,188 B2 | 10/2018 | Geerlings |
| 10,097,680 B2 | 10/2018 | Bauer |
| 10,127,804 B2 | 11/2018 | Geerlings |
| 10,147,310 B2 | 12/2018 | Geerlings |
| 10,163,337 B2 | 12/2018 | Geerlings |
| 10,163,366 B2 | 12/2018 | Wright |
| 10,176,708 B2 | 1/2019 | Geerlings |
| 10,198,938 B2 | 2/2019 | Geerlings |
| 10,217,303 B1 | 2/2019 | Hall |
| 10,229,548 B2 | 3/2019 | Daniel-Wayman |
| 10,282,977 B2 | 5/2019 | Witkowski |
| 10,553,050 B1 | 2/2020 | Romero |
| 10,614,650 B2 | 4/2020 | Minsley |
| 10,652,743 B2 | 5/2020 | Fitzgibbon |
| 10,713,869 B2 | 7/2020 | Morris |
| 10,997,810 B2 | 5/2021 | Atwell |
| 11,074,773 B1 * | 7/2021 | Morris .............. G07C 9/00896 |
| 11,122,430 B2 | 9/2021 | Fitzgibbon |
| 11,423,717 B2 | 8/2022 | Cate |
| 11,462,067 B2 | 10/2022 | Atwell |
| 11,763,616 B1 | 9/2023 | Morris |
| 2001/0023483 A1 | 9/2001 | Kiyomoto |
| 2002/0034303 A1 | 3/2002 | Farris |
| 2002/0075133 A1 | 6/2002 | Flick |
| 2002/0083178 A1 | 6/2002 | Brothers |
| 2002/0183008 A1 | 12/2002 | Menard |
| 2002/0184504 A1 | 12/2002 | Hughes |
| 2002/0191785 A1 | 12/2002 | McBrearty |
| 2002/0191794 A1 | 12/2002 | Farris |
| 2003/0025793 A1 | 2/2003 | Mcmahon |
| 2003/0033540 A1 | 2/2003 | Fitzgibbon |
| 2003/0051155 A1 | 3/2003 | Martin |
| 2003/0056001 A1 | 3/2003 | Mate |
| 2003/0070092 A1 | 4/2003 | Hawkes |
| 2003/0072445 A1 | 4/2003 | Kuhlman |
| 2003/0118187 A1 | 6/2003 | Fitzgibbon |
| 2003/0141987 A1 | 7/2003 | Hayes |
| 2003/0147536 A1 | 8/2003 | Andivahis |
| 2003/0177237 A1 | 9/2003 | Stebbings |
| 2003/0189530 A1 | 10/2003 | Tsui |
| 2003/0190906 A1 | 10/2003 | Winick |
| 2003/0191949 A1 | 10/2003 | Odagawa |
| 2003/0227370 A1 | 12/2003 | Brookbank |
| 2004/0019783 A1 | 1/2004 | Hawkes |
| 2004/0046639 A1 | 3/2004 | Giehler |
| 2004/0054906 A1 | 3/2004 | Carro |
| 2004/0081075 A1 | 4/2004 | Tsukakoshi |
| 2004/0174856 A1 | 9/2004 | Brouet |
| 2004/0179485 A1 | 9/2004 | Terrier |
| 2004/0181569 A1 | 9/2004 | Attar |
| 2004/0257200 A1 | 12/2004 | Baumgardner |
| 2005/0030153 A1 | 2/2005 | Mullet |
| 2005/0046545 A1 | 3/2005 | Skekloff |
| 2005/0053022 A1 | 3/2005 | Zettwoch |
| 2005/0058153 A1 | 3/2005 | Santhoff |
| 2005/0060555 A1 | 3/2005 | Raghunath |
| 2005/0101314 A1 | 5/2005 | Levi |
| 2005/0151667 A1 | 7/2005 | Hetzel |
| 2005/0174242 A1 | 8/2005 | Cohen |
| 2005/0285719 A1 | 12/2005 | Stephens |
| 2006/0020796 A1 | 1/2006 | Aura |
| 2006/0046794 A1 | 3/2006 | Scherschel |
| 2006/0083187 A1 | 4/2006 | Dekel |
| 2006/0097843 A1 | 5/2006 | Libin |
| 2006/0103503 A1 | 5/2006 | Rodriquez |
| 2006/0109978 A1 | 5/2006 | Farris |
| 2006/0164208 A1 | 7/2006 | Schaffzin |
| 2006/0176171 A1 | 8/2006 | Fitzgibbon |
| 2006/0224512 A1 | 10/2006 | Kurakata |
| 2006/0232377 A1 | 10/2006 | Witkowski |
| 2007/0005806 A1 | 1/2007 | Fitzgibbon |
| 2007/0006319 A1 | 1/2007 | Fitzgibbon |
| 2007/0018861 A1 | 1/2007 | Fitzgibbon |
| 2007/0058811 A1 | 3/2007 | Fitzgibbon |
| 2007/0167138 A1 | 7/2007 | Bauman |
| 2007/0245147 A1 | 10/2007 | Okeya |
| 2008/0194291 A1 | 8/2008 | Martin |
| 2008/0224886 A1 | 9/2008 | Rodriguez et al. |
| 2008/0229400 A1 | 9/2008 | Burke |
| 2008/0291047 A1 | 11/2008 | Summerford |
| 2008/0297370 A1 | 12/2008 | Farris |
| 2008/0303630 A1 | 12/2008 | Martinez |
| 2009/0016530 A1 | 1/2009 | Farris |
| 2009/0021348 A1 | 1/2009 | Farris |
| 2009/0096621 A1 | 4/2009 | Ferlitsch |
| 2009/0176451 A1 | 7/2009 | Yang et al. |
| 2009/0313095 A1 | 12/2009 | Hurpin |
| 2009/0315672 A1 | 12/2009 | Nantz et al. |
| 2010/0029261 A1 | 2/2010 | Mikkelsen |
| 2010/0060413 A1 | 3/2010 | Fitzgibbon et al. |
| 2010/0112979 A1 | 5/2010 | Chen et al. |
| 2010/0125509 A1 | 5/2010 | Kranzley et al. |
| 2010/0125516 A1 | 5/2010 | Wankmueller et al. |
| 2010/0159846 A1 | 6/2010 | Witkowski |
| 2010/0199092 A1 | 8/2010 | Andrus et al. |
| 2010/0211779 A1 | 8/2010 | Sundaram |
| 2011/0037574 A1 | 2/2011 | Pratt |
| 2011/0051927 A1 | 3/2011 | Murray et al. |
| 2011/0205014 A1 | 8/2011 | Fitzgibbon |
| 2011/0218965 A1 | 9/2011 | Lee |
| 2011/0225451 A1 | 9/2011 | Leggette |
| 2011/0227698 A1 | 9/2011 | Witkowski |
| 2011/0273268 A1 | 11/2011 | Bassali |
| 2011/0287757 A1 | 11/2011 | Nykoluk |
| 2011/0296185 A1 | 12/2011 | Kamarthy et al. |
| 2011/0316668 A1 | 12/2011 | Laird |
| 2011/0316688 A1 | 12/2011 | Ranjan |
| 2011/0317835 A1 | 12/2011 | Laird |
| 2011/0320803 A1 | 12/2011 | Hampel et al. |
| 2012/0054493 A1 | 3/2012 | Bradley |
| 2012/0133841 A1 | 5/2012 | Vanderhoff |
| 2012/0191770 A1 | 7/2012 | Perlmutter |
| 2012/0254960 A1 | 10/2012 | Lortz |
| 2012/0297681 A1 | 11/2012 | Krupke et al. |
| 2013/0017812 A1 | 1/2013 | Foster |
| 2013/0063243 A1 | 3/2013 | Witkowski |
| 2013/0088326 A1 | 4/2013 | Bassali |
| 2013/0147600 A1 | 6/2013 | Murray |
| 2013/0170639 A1 | 7/2013 | Fitzgibbon |
| 2013/0268333 A1 | 10/2013 | Ovick et al. |
| 2013/0272520 A1 | 10/2013 | Noda et al. |
| 2013/0304863 A1 | 11/2013 | Reber |
| 2014/0125499 A1 | 5/2014 | Cate |
| 2014/0169247 A1 | 6/2014 | Jafarian et al. |
| 2014/0245284 A1 | 8/2014 | Alrabady |
| 2014/0266589 A1 | 9/2014 | Wilder |
| 2014/0282929 A1 | 9/2014 | Tse |
| 2014/0289528 A1 | 9/2014 | Baghdasaryan |
| 2014/0327690 A1 | 11/2014 | Mcguire |
| 2014/0361866 A1 | 12/2014 | Evans |
| 2015/0002262 A1 | 1/2015 | Geerlings |
| 2015/0022436 A1 | 1/2015 | Cho |
| 2015/0084750 A1 | 3/2015 | Fitzgibbon |
| 2015/0116082 A1 | 4/2015 | Cregg |
| 2015/0139423 A1 | 5/2015 | Hildebrandt |
| 2015/0161832 A1 | 6/2015 | Esselink |
| 2015/0187019 A1 | 7/2015 | Fernandes |
| 2015/0193999 A1 | 7/2015 | Freese |
| 2015/0222436 A1 | 8/2015 | Morten |
| 2015/0222517 A1 | 8/2015 | McLaughlin et al. |
| 2015/0235172 A1 | 8/2015 | Hall |
| 2015/0235173 A1 | 8/2015 | Hall |
| 2015/0235493 A1 | 8/2015 | Hall |
| 2015/0235495 A1 | 8/2015 | Hall |
| 2015/0261521 A1 | 9/2015 | Choi |
| 2015/0310737 A1 | 10/2015 | Simanowski |
| 2015/0310765 A1 | 10/2015 | Wright |
| 2015/0358814 A1 | 12/2015 | Roberts |
| 2016/0009188 A1 | 1/2016 | Yokoyama |
| 2016/0020813 A1 | 1/2016 | Pilat |
| 2016/0021140 A1 | 1/2016 | Fitzgibbon |

(56) References Cited

U.S. PATENT DOCUMENTS

| | | |
|---|---|---|
| 2016/0043762 A1 | 2/2016 | Turnbull |
| 2016/0101736 A1 | 4/2016 | Geerlings |
| 2016/0104374 A1 | 4/2016 | Ypma |
| 2016/0125357 A1 | 5/2016 | Hall |
| 2016/0145903 A1 | 5/2016 | Taylor |
| 2016/0196706 A1 | 7/2016 | Tehranchi |
| 2016/0198391 A1 | 7/2016 | Orthmann et al. |
| 2016/0203721 A1 | 7/2016 | Wright |
| 2016/0258202 A1 | 9/2016 | Scalisi |
| 2016/0261572 A1 | 9/2016 | Liu et al. |
| 2016/0359629 A1 | 12/2016 | Nadathur |
| 2017/0061110 A1 | 3/2017 | Wright |
| 2017/0079082 A1 | 3/2017 | Papay |
| 2017/0113619 A1 | 4/2017 | Boehm |
| 2017/0140643 A1 | 5/2017 | Puppo |
| 2017/0225526 A1 | 8/2017 | Tomakidi |
| 2017/0230509 A1 | 8/2017 | Lablans |
| 2017/0316628 A1 | 11/2017 | Farber |
| 2017/0320464 A1 | 11/2017 | Schultz |
| 2017/0323498 A1 | 11/2017 | Bauer |
| 2017/0352286 A1 | 12/2017 | Witkowski |
| 2017/0364719 A1 | 12/2017 | Boehm |
| 2017/0372574 A1 | 12/2017 | Linsky |
| 2018/0052860 A1 | 2/2018 | Hayes |
| 2018/0053237 A1 | 2/2018 | Hayes |
| 2018/0118045 A1 | 5/2018 | Gruzen |
| 2018/0123806 A1 | 5/2018 | Vuyst |
| 2018/0184376 A1 | 6/2018 | Geerlings |
| 2018/0225959 A1 | 8/2018 | Witkowski |
| 2018/0232981 A1 | 8/2018 | Geerlings |
| 2018/0234843 A1 | 8/2018 | Smyth |
| 2018/0245559 A1 | 8/2018 | Kang |
| 2018/0246515 A1 | 8/2018 | Iwama |
| 2018/0276613 A1 | 9/2018 | Hall |
| 2018/0285814 A1 | 10/2018 | Hall |
| 2018/0367419 A1 | 12/2018 | Hall |
| 2019/0043290 A1 | 2/2019 | Morris |
| 2019/0082149 A1 | 3/2019 | Correnti |
| 2019/0085615 A1 | 3/2019 | Cate |
| 2019/0102962 A1 | 4/2019 | Miller |
| 2019/0200225 A1 | 6/2019 | Fitzgibbon |
| 2019/0208024 A1 | 7/2019 | Jablonski |
| 2019/0228603 A1 | 7/2019 | Fowler |
| 2019/0244448 A1 | 8/2019 | Alamin |
| 2020/0027054 A1 | 1/2020 | Hall |
| 2020/0043270 A1 | 2/2020 | Cate |
| 2020/0074753 A1 | 3/2020 | Adiga |
| 2020/0208461 A1 | 7/2020 | Virgin |
| 2020/0236552 A1 | 7/2020 | Fitzgibbon |
| 2020/0364961 A1 | 11/2020 | Atwell |
| 2021/0248852 A1 | 8/2021 | Atwell |
| 2021/0281405 A1 | 9/2021 | Fitzgibbon et al. |
| 2021/0358239 A1 | 11/2021 | Key |
| 2021/0385651 A1 | 12/2021 | Fitzgibbon |
| 2022/0375287 A1 | 11/2022 | Cate |

FOREIGN PATENT DOCUMENTS

| | | |
|---|---|---|
| AU | 2006200340 | 8/2006 |
| AU | 2007203558 B2 | 2/2008 |
| AU | 2008202369 A1 | 1/2009 |
| AU | 2011202656 A1 | 1/2012 |
| AU | 2011218848 A1 | 9/2012 |
| CA | 2087722 C | 7/1998 |
| CA | 2193846 C | 2/2004 |
| CA | 2551295 | 12/2006 |
| CA | 2926281 | 2/2008 |
| CA | 2177410 C | 4/2008 |
| CA | 2443452 C | 7/2008 |
| CA | 2684658 A1 | 10/2008 |
| CA | 2708000 A1 | 12/2010 |
| CA | 2456680 C | 2/2011 |
| CA | 2742018 A1 | 12/2011 |
| CA | 2565505 C | 9/2012 |
| CA | 2631076 C | 9/2013 |
| CA | 2790940 C | 6/2014 |
| CA | 2596188 C | 7/2016 |
| CN | 101399825 A | 4/2009 |
| DE | 102010015104 | 11/1957 |
| DE | 3234538 A1 | 3/1984 |
| DE | 3234539 A1 | 3/1984 |
| DE | 3244049 A1 | 9/1984 |
| DE | 3309802 A1 | 9/1984 |
| DE | 3309802 C2 | 9/1984 |
| DE | 3320721 | 12/1984 |
| DE | 3332721 A1 | 3/1985 |
| DE | 3407436 A1 | 8/1985 |
| DE | 3407469 A1 | 9/1985 |
| DE | 3532156 A1 | 3/1987 |
| DE | 3636822 C1 | 10/1987 |
| DE | 4204463 | 8/1992 |
| DE | 102006003808 | 11/2006 |
| DE | 102007036647 | 2/2008 |
| EP | 0043270 A1 | 1/1982 |
| EP | 0103790 A2 | 3/1984 |
| EP | 0154019 A1 | 9/1985 |
| EP | 0155378 A1 | 9/1985 |
| EP | 0244322 | 11/1987 |
| EP | 0244332 B1 | 11/1987 |
| EP | 0311112 A2 | 4/1989 |
| EP | 0335912 | 10/1989 |
| EP | 0372285 | 6/1990 |
| EP | 0265935 B1 | 5/1991 |
| EP | 0459781 | 12/1991 |
| EP | 0857842 | 8/1998 |
| EP | 0870889 | 10/1998 |
| EP | 0937845 A1 | 8/1999 |
| EP | 1024626 A1 | 8/2000 |
| EP | 1223700 | 7/2002 |
| EP | 1313260 | 5/2003 |
| EP | 1421728 A1 | 5/2004 |
| EP | 1625560 A1 | 2/2006 |
| EP | 1760985 A2 | 3/2007 |
| EP | 0771498 B1 | 5/2007 |
| EP | 1865656 A1 | 12/2007 |
| EP | 2293478 A2 | 3/2011 |
| EP | 2149103 B1 | 12/2011 |
| EP | 2437212 A1 | 4/2012 |
| EP | 1875333 B1 | 1/2013 |
| EP | 2290872 B1 | 6/2014 |
| EP | 2800403 A1 | 11/2014 |
| FR | 2606232 | 5/1988 |
| FR | 2607544 | 6/1988 |
| FR | 2685520 | 6/1993 |
| FR | 2737373 | 1/1997 |
| GB | 218774 | 7/1924 |
| GB | 1156279 | 6/1969 |
| GB | 2023899 | 1/1980 |
| GB | 2051442 | 1/1981 |
| GB | 2099195 | 12/1982 |
| GB | 2118614 | 11/1983 |
| GB | 2131992 | 6/1984 |
| GB | 2133073 | 7/1984 |
| GB | 2184774 | 7/1987 |
| GB | 2254461 | 10/1992 |
| GB | 2265482 | 9/1993 |
| GB | 2288261 | 10/1995 |
| GB | 2430115 | 3/2007 |
| GB | 2440816 | 2/2008 |
| GB | 2453383 A | 4/2009 |
| JP | H6205474 | 7/1994 |
| JP | 09322274 | 12/1997 |
| KR | 20050005150 | 1/2005 |
| KR | 20060035951 | 4/2006 |
| WO | 9300137 | 1/1993 |
| WO | 9301140 | 1/1993 |
| WO | 9320538 | 10/1993 |
| WO | 9400147 | 1/1994 |
| WO | 9411829 | 5/1994 |
| WO | 9418036 | 8/1994 |
| WO | 0010301 | 2/2000 |
| WO | 0010302 | 2/2000 |
| WO | 03010656 | 2/2003 |
| WO | 03079607 A1 | 9/2003 |

(56) References Cited

FOREIGN PATENT DOCUMENTS

| | | |
|---|---|---|
| WO | 2008082482 | 7/2008 |
| WO | 2011106199 | 9/2011 |
| WO | 2019126453 | 6/2019 |
| ZA | 8908225 | 10/1991 |

OTHER PUBLICATIONS

US 10,135,479 B2, 11/2018, Turnbull (withdrawn)
'Access Transmitters—Access Security System', pp. 1-2, Dated Jul. 16, 1997. http://www.webercreations.com/access/security.html.
About us—ParqEx, 5 pages, Wayback Machine capture dated May 5, 2018, 5 pages, retrieved from https://web.archive.org/web/20180505051951/https://www.parqex.com/about-parqex/.
Abrams, and Podell, 'Tutorial Computer and Network Security,' District of Columbia: IEEE, 1987. pp. 1075-1081.
Abramson, Norman. 'The Aloha System—Another alternative for computer communications,' pp. 281-285, University of Hawaii, 1970.
Adams, Russ, Classified, data-scrambling program for Apple II, Info-World, vol. 5, No. 3; Jan. 31, 1988.
Alexi, Werner, et al. 'RSA and Rabin Functions: Certain Parts Are As Hard As The Whole', pp. 194-209, Siam Computing, vol. 14, No. 2, Apr. 1988.
Allianz: Allianz-Zentrum for Technik GmbH—Detailed Requirements for Fulfilling the Specification Profile for Electronically Coded OEM Immobilizers, Issue 22, (Jun. 1994 (Translation Jul. 5, 1994).
Anderson, Ross. 'Searching for the Optimum Correlation Attack', pp. 137-143, Computer Laboratory, Pembroke Street, Cambridge CB2 3QG, Copyright 1995.
Arazi, Benjamin, Vehicular Implementations of Public Key Cryptographic Techniques, IEEE Transactions on Vehicular Technology, vol. 40, No. 3, Aug. 1991, 646-653.
Baran, P. Distribution Communications, vol. 9, 'Security Secrecy and Tamper-free Communications', Rand Corporation, 1964.
Barbaroux, Paul. 'Uniform Results in. Polynomial-Time Security', pp. 297-306, Advances in Cryptology—Eurocrypt 92, 1992.
Barlow, Mike, 'A Mathematical Word Block Cipher,' 12 Cryptologia 256-264 (1988).
Bellovin, S.M. 'Security Problems in the TCPIP Protocol Suite', pp. 32-49, Computer Communication Review, New Jersey, Reprinted from Computer Communication Review, vol. 19, No. 2, pp. 32-48, Apr. 1989.
Beutelspacher, Albrecht. Advances in Cryptology—Eurocrypt 87: 'Perfect and Essentially Perfect Authentication Schemes' (Extended Abstract), pp. 167-170, Federal Republic of Germany, believed to be publicly available prior to Jun. 30, 2004.
Bloch, Gilbert. Enigma Before Ultra Polish Work and The French Contribution, pp. 142-155, Cryptologia 11(3), (Jul. 1987).
Bosworth, Bruce, 'Codes, Ciphers, and Computers: An Introduction to Information Security' Hayden Book Company, Inc. 1982, pp. 30-54.
Brickell, Ernest F. and Stinson, Doug. 'Authentication Codes With Multiple Arbiters', pp. 51-55, Proceedings of Eurocrypt 88, 1988.
Bruwer, Frederick J. 'Die Toepassing Van Gekombineerde Konvolusiekodering en Modulasie op HF-Datakommunikasie,' District of Pretoria in South Africa Jul. 1998, 176 pages.
Burger, Chris R., Secure Learning RKE Systems Using KeeLoq. RTM. Encoders, TB001, 1996 Microchip Technology, Inc., 1-7.
Burmeister, Mike. A Remark on the Efficiency of Identification Schemes, pp. 493-495, Advances in Cryptology—Eurocrypt 90, (1990).
Canadian Application No. 3,085,470; Office Action Dated Mar. 31, 2023; 10 pages.
Cattermole, K.W., 'Principles of Pulse Code Modulation' Iliffe Books Ltd., 1969, pp. 30-381.
Cerf, Vinton a 'Issues in Packet-Network Interconnection', pp. 1386-1408, Proceedings of the IEEE, 66(11), Nov. 1978.

Cerf, Vinton G. and Kahn, Robert E. 'A Protocol for Packet Network Intercommunication', pp. 637-648, Transactions on Communications, vol. Com-22, No. 5, May 1974.
Charles Watts, How to Program the HiSec(TM) Remote Keyless Entry Rolling Code Generator, National Semiconductor, Oct. 1994, 1-4.
Chinese Application No. 201880083263X; First Office Action Dated Oct. 3, 2021; Our File No. 5569-144643-CN; 25 Pages.
Computer Arithmetic by Henry Jacobowitz; Library of Congress Catalog Card No. 62-13396; Copyright Mar. 1962 by John F. Rider Publisher, Inc.
Conner, Doug, Cryptographic Techniques—Secure Your Wireless Designs, EDN (Design Feature), Jan. 18, 1996, 57-68.
Coppersmith, Don. 'Fast Evaluation of Logarithms in Fields of Characteristic Two', IT-30(4): pp. 587-594, IEEE Transactions on Information Theory, Jul. 1984.
Daniels, George, 'Pushbutton Controls for Garage Doors' Popular Science (Aug. 1959), pp. 156-160.
Davies, D.W. and Price, W.C. 'Security for Computer Networks,' John Wiley and Sons, 1984. Chapter 7, pp. 175-176.
Davies, Donald W., 'Tutorial: The Security of Data in Networks,' pp. 13-17, New York: IEEE, 1981.
Davis, Ben and De Long, Ron. Combined Remote Key Control and Immobilization System for Vehicle Security, pp. 125-132, Power Electronics in Transportation, IEEE Catalogue No. 96TH8184, (Oct. 24, 1996).
Davis, Gregory and Palmer, Morris. Self-Programming, Rolling-Code Technology Creates Nearly Unbreakable RF Security, Technological Horizons, Texas Instruments, Inc. (ECN), (Oct. 1996).
Deavours, C. A. and Reeds, James. The Enigma, Part 1, Historical Perspectives, pp. 381-391, Cryptologia, 1(4), (Oct. 1977).
Deavours, C.A. and Kruh, L. 'The Swedish HC-9 Ciphering Machine', 251-285, Cryptologia, 13(3): Jul. 1989.
Deavours, Cipher A., et al. 'Analysis of the Hebern cryptograph Using Isomorphs', pp. 246-261, Cryptology: Yesterday, Today and Tomorrow, vol. 1, No. 2, Apr. 1977.
Denning, Dorothy E. 'Cryptographic Techniques', pp. 135-154, Cryptography and Data Security, 1982. Chapter 3.
Denning, Dorothy E. A Lattice Model of Secure Information Flow, pp. 236-238, 240, 242, Communications of the ACM, vol. 19, No. 5, (May 1976).
Diffie and Hellman, Exhaustive Cryptanalysis of the NB.S Data Encryption Standard, pp. 74-84, Computer, Jun. 1977.
Diffie, Whitfield and Hellman, Martin E. New Directions in Cryptography, pp. 644-654, IEEE Transactions on Information Theory, vol. IT-22, No. 6, (Nov. 1976).
Diffie, Whitfield and Hellman, Martin E. Privacy and Authentication: An Introduction to Cryptography, pp. 397-427, Proceedings of the IEEE, vol. 67, No. 3 (Mar. 1979).
Diffie, Whitfield and Hellman, Martin, E. 'An RSA Laboratories Technical Note', Version 1.4, Revised Nov. 1, 1993.
Dijkstra, E. W. Co-Operating Sequential Processes, pp. 43-112, Programming Languages, F. Genuys. NY, believed to be publicly available prior to Jun. 30, 2004.
Dijkstra, E.W. 'Hierarchical Ordering of Sequential Processes', pp. 115-138, Acta Informatica 1: 115-138, Springer-Verlag (1971).
ElGamal, Taher. A Public Key Cryptosystem and a Signature Scheme Based on Discrete Logarithms, pp. 469-472, IEEE, Transactions on Information Theory, vol. IT-31, No. 4, (Jul. 1985).
ElGamal, Taher. A Subexponential Time Algorithm for Computing Discrete Logarithms, pp. 473-481, IEEE, Transactions on Information Theory, vol. IT-31, No. 4, (Jul. 1985).
Feistel, Horst, Notz, Wm. A. and Smith, J. Lynn. Some Cryptographic Techniques for Machine-to-Machine Data Communications, pp. 1545-1554, Proceedings of the IEEE, vol. 63, No. 11, (Nov. 1975).
Feistel, Horst. 'Cryptography and Computer Privacy', pp. 15-23, Scientific American, vol. 228, No. 5, May 1973.
Fenzl, H. and Kliner, A. Electronic Lock System: Convenient and Safe, pp. 150-153, Siemens Components XXI, No. 4, (1987).
Fischer, Elliot. Uncaging the Hagelin Cryptograph, pp. 89-92, Cryptologia, vol. 7, No. 1, (Jan. 1983).

(56) References Cited

OTHER PUBLICATIONS

Fragano, Maurizio. Solid State Key/Lock Security System, pp. 604-607, IEEE Transactions on Consumer Electronics, vol. CE-30, No. 4, (Nov. 1984).
G. Davis, Marcstar. TM. TRC1300 and TRC1315 Remote Control Transmitter/Receiver, Texas Instruments, Sep. 12, 1994. 1-24.
Godlewski, Ph. and Camion P. 'Manipulations and Errors, Delection and Localization,' pp. 97-106, Proceedings of Eurocrypt 88, 1988.
Gordon, Professor J., Police Scientific Development Branch, Designing Codes for Vehicle Remote Security Systems, (Oct. 1994), pp. 1-20.
Gordon, Professor J., Police Scientific Development Branch, Designing Rolling Codes for Vehicle Remote Security Systems, (Aug. 1993), pp. 1-19.
Greenlee, B.M., Requirements for Key Management Protocols in the Wholesale Financial Services Industry, pp. 22 28, IEEE Communications Magazine , Sep. 1985.
Guillou, Louis C. and Quisquater, Jean-Jacques. 'A Practical Zero-Knowledge Protocol Fitted to Security Microprocessor Minimizing Both Transmission and Memory', pp. 123-128, Advances in Cryptology—Eurocrypt 88, 1988.
Guillou, Louis C. Smart Cards and Conditional Access, pp. 481-489, Proceedings of Eurocrypt, (1984).
Habermann, A. Nico, Synchronization of Communicating Processes , pp. 171 176, Communications , Mar. 1972.
Hagelin C-35/C-36 (The), (1 page) Sep. 3, 1998. http://hem.passagen.se/tan01/C035.HTML.
Haykin, Simon, "An Introduction to Analog and Digital Communications" 213, 215 (1989).
IEEE 100; The Authoritative Dictionary of IEEE Standards Terms, Seventh Edition, Published by Standards Information Network, IEEE Press, Copyright 2000.
ISO 8732: 1988(E): Banking Key Management (Wholesale) Annex D: Windows and Windows Management, Nov. 1988.
Jones, Anita K. Protection Mechanisms and The Enforcement of Security Policies, pp. 228-251, Carnegie-Mellon University, Pittsburgh, PA, (1978).
Jueneman, R.R et al. 'Message Authentication', pp. 29-40, IEEE Communications Magazine, vol. 23, No. 9, Sep. 1985.
Kahn, Robert E. The Organization of Computer Resources Into A Packet Radio Network, pp. 177-186, National Computer Conference, (1975).
Keeloq.RTM. Code Hopping Decoder, HCS500, 1997 Microchip Technology, Inc., 1-25.
Keeloq.RTM. Code Hopping Encoder, HCS300, 1996 Microchip Technology, Inc., 1-20.
Keeloq.RTM. NTQ 105 Code Hopping Encoder, pp. 1-8, Nanoteq (Pty.) Ltd., (Jul. 1993).
Keeloq.RTM. NTQ 125D Code Hopping Decoder, pp. 1-9, Nanoteq (pty.) Ltd., (Jul. 1993).
Kent, Stephen T. A Comparison of Some Aspects of Public-Key and Conventional Cryptosystems, pp. 4.3.1-5, ICC '79 Int. Conf. on Communications, Boston, MA, (Jun. 1979).
Kent, Stephen T. Comments on 'Security Problems in the TCP/IP Protocol Suite', pp. 10-19, Computer Communication Review, vol. 19, Part 3, (Jul. 1989).
Kent, Stephen T. Encryption-Based Protection Protocols for Interactive User-Computer Communication, pp. 1-121, (May 1976). (See pp. 50-53).
Kent, Stephen T. Protocol Design Consideration for Network Security, pp. 239-259, Proc. NATO Advanced Study Institute on Interlinking of Computer Networks, (1979).
Kent, Stephen T. Security Requirements and Protocols for a Broadcast Scenario, pp. 778-786, IEEE Transactions on Communications, vol. com-29, No. 6, (Jun. 1981).
Kent, Stephen T., et al. Personal Authorization System for Access Control to the Defense Data Network, pp. 89-93, Conf. Record of Eascon 82 15.sup.th Ann Electronics & Aerospace Systems Conf., Washington, D.C. (Sep. 1982).
Konheim, A.G. Cryptography: A Primer, pp. 285-347, New York, (John Wiley, 1981).
Korean Patent Application No. 10-2020-7020761; Office Action dated Apr. 29, 2022, With Translation.
Koren, Israel, "Computer Arithmetic Algorithms" Prentice Hall, 1978, pp. 1-15.
Kruh, Louis. Device and Machines: The Hagelin Cryptographer, Type C-52, pp. 78-82, Cryptologia, vol. 3, No. 2, (Apr. 1979).
Kruh, Louis. How to Use the German Enigma Cipher Machine: A photographic Essay, pp. 291-296, Cryptologia, vol. No. 7, No. 4 (Oct. 1983).
Kuhn, G.J., et al. A Versatile High-Speed Encryption Chip, INFOSEC '90 Symposium, Pretoria, (Mar. 16, 1990).
Kuhn. G.J. Algorithms for Self-Synchronizing Ciphers, pp. 159-164, Comsig 88, University of Pretoria, Pretoria, (1988).
Lamport, Leslie. The Synchronization of Independent Processes, pp. 15-34, Acta Informatica, vol. 7, (1976).
Linn, John and Kent, Stephen T. Electronic Mail Privacy Enhancement, pp. 40-43, American Institute of Aeronautics and Astronautics, Inc. (1986).
Lloyd, Sheelagh. Counting Functions Satisfying a Higher Order Strict Avalanche Criterion, pp. 63-74, (1990).
Marneweck, Kobus. Guidelines for KeeLoq.RTM. Secure Learning Implementation, TB007, pp. 1-5, 1987 Microchip Technology, Inc.
Massey, James L. The Difficulty with Difficulty, pp. 1-4, Jul. 17, 1996. http://www.iacr.org/conferences/ec96/massey/html/framemassey.html.
McIvor, Robert. Smart Cards, pp. 152-159, Scientific American, vol. 253, No. 5, (Nov. 1985).
Meier, Willi. Fast Correlations Attacks on Stream Ciphers (Extended Abstract), pp. 301-314, Eurocrypt 88, IEEE, (1988).
Meyer, Carl H. and Matyas Stephen H. Cryptography: A New Dimension in Computer Data Security, pp. 237-249 (1982).
Michener, J.R. The 'Generalized Rotor' Cryptographic Operator and Some of Its Applications, pp. 97-113, Cryptologia, vol. 9, No. 2, (Apr. 1985).
Microchip Technology, Inc., Enhanced Flash Microcontrollers with 10-Bit A/D and nano Watt Technology, PIC18F2525/2620/4525/4620 Data Sheet, 28/40/44-Pin, .COPYRGT.2008.
MM57HS01 HiSeC.TM. Fixed and Rolling Code Decoder, National Semiconductor, Nov. 11, 1994, 1-8.
Morris, Robert. The Hagelin Cipher Machine (M-209): Reconstruction of the Internal Settings, pp. 267-289, Cryptologia, 2(3), (Jul. 1978).
Newman, David B., Jr., et al. 'Public Key Management for Network Security', pp. 11-16, IEE Network Magazine, 1987.
Nickels, Hamilton, 'Secrets of Making and Breading Codes' Paladin Press, 1990, pp. 11-29.
Niederreiter, Harald. Keystream Sequences with a Good Linear Complexity Profile for Every Starting Point, pp. 523-532, Proceedings of Eurocrypt 89, (1989).
Nirdhar Khazanie and Yossi Matias, Growing Eddystone with Ephemeral Identifiers: A Privacy Aware & Secure Open Beacon Format; Google Developers; Thursday, Apr. 14, 2016; 6 pages.
NM95HSO1/NM95HSO2 HiSeC.TM. (High Security Code) Generator, pp. 1-19, National Semiconductor, (Jan. 1995).
Otway, Dave and Rees, Owen. Efficient and timely mutual authentication, ACM SIGOPS Operating Systems Review, vol. 21, Issue 1, Jan. 8-10, 1987.
PCT Patent Application No. PCT/US2021/065227; International Search Report and The Written Opinion; Dated May 12, 2022; 12 Pages.
Peebles, Jr., Peyton Z. and Giuma, Tayeb A.; "Principles of Electrical Engineering" McGraw Hill, Inc., 1991, pp. 562-597.
Peyret, Patrice, et al. Smart Cards Provide Very High Security and Flexibility in Subscribers Management, pp. 744-752, IEE Transactions on Consumer Electronics, 36(3), (Aug. 1990).
Postel, J. ed. 'DOD Standard Transmission Control Protocol', pp. 52-133, Jan. 1980.
Postel, Jonathon B., et al. The ARPA Internet Protocol, pp. 261-271, (1981).

(56) References Cited

OTHER PUBLICATIONS

Reed, David P. and Kanodia, Rajendra K. Synchronization with Eventcounts and Sequencers, pp. 115-123, Communications of the ACM, vol. 22, No. 2, (Feb. 1979).
Reynolds, J. and Postel, J. Official ARPA-Internet Protocols, Network Working Groups, (Apr. 1985).
Roden, Martin S., "Analog and Digital Communication Systems," Third Edition, Prentice Hall, 1979, pp. 282-460.
Ruffell, J. Battery Low Indicator, p. 15-165, Eleckton Electronics, (Mar. 1989). (See p. 59).
Saab Anti-Theft System: 'Saab's Engine Immobilizing Anti-Theft System is a Road-Block for 'Code-Grabbing' Thieves', pp. 1-2, Aug. 1996; http://www.saabusa.com/news/newsindex/alarm.html.
Savage. J.E. Some Simple Self-Synchronizing Digital Data Scramblers, pp. 449-498, The Bell System Tech. Journal, (Feb. 1967).
Seberry, J. and Pieprzyk, Cryptography—An Introduction to Computer Security, Prentice Hall of Australia, YTY Ltd, 1989, pp. 134-136.
Secure Terminal Interface Module for Smart Card Application, pp. 1488-1489, IBM: Technical Disclosure Bulletin, vol. 28, No. 4, (Sep. 1985).
Shamir, Adi. 'Embedding Cryptographic Trapdoors In Arbitrary Knapsack Systems', pp. 77-79, Information Processing Letters, 1983.
Siegenthaler, T. Decrypting a Class of Stream Ciphers Using Ciphertext Only, pp. 81-85, IEEE Transactions on Computers, vol. C-34, No. 1, (Jan. 1985).
Simmons, Gustavus, J. Message Authentication with Arbitration of Transmitter/Receiver Disputes, pp. 151-165 (1987).
Smith, J.L., et al. An Experimental Application of Cryptography to a Remotely Accessed Data System, pp. 282-297, Proceedings of the ACM, (Aug. 1972).
Smith, Jack, 'Modem Communication Circuits.' McGraw-Hill Book Company, 1986, Chapter 11, pp. 420-454.
Smith, Jack, 'Modem Communication Circuits' McGraw-Hill Book Company, 1986, Chapter 7, pp. 231-294.
Smith. J.L. The Design of Lucifer: a Cryptographic Device for Data Communications, pp. 1-65, (Apr. 15, 1971).
Soete, M. Some constructions for authentication—secrecy codes, Advances in Cryptology—Eurocrypt '88, Lecture Notes in Computer Science 303 (1988), 57-75.
Spothero, Frequently Asked Questions, Wayback Machine capture dated Jun. 30, 2017, 3 pages, retrieved from https://web.archive.org/web/20170630063148/https://spothero.com/faq/.
Steven Dawson, Keeloq.RTM. Code Hopping Decoder Using Secure Learn, AN662, 1997 Microchip Technology, Inc., 1-16.
Summary of Spothero Product, publicly available before Aug. 1, 2018.
Svigals, J. Limiting Access to Data in an Identification Card Having A Micro-Processor, pp. 580-581, IBM: Technical Disclosure Bulletin, vol. 27, No. 1B, (Jun. 1984).
Thatcham: The Motor Insurance Repair Research Centre, The British Insurance Industry's Criteria for Vehicle Security (Jan. 1993) (Lear 18968-19027), pp. 1-36.
Transaction Completion Code Based on Digital Signatures, pp. 1109-1122, IBM: Technical Disclosure Bulletin, vol. 28, No. 3, (Aug. 1985).
Turn, Rein. Privacy Transformations for Databank Systems, pp. 589-601, National Computer Conference, (1973).
U.S. Appl. No. 16/528,376; Advisory Action Dated May 4, 2021; 4 pages.
U.S. Appl. No. 17/245,672; Application as filed on Apr. 30, 2021, 47 pages.
U.S. Appl. No. 17/384,149; Office Action Dated Jan. 26, 2023; 54 pages.
U.S. Appl. No. 16/454,978; Notice of Allowance mailed Feb. 16, 2021, 9 pages.
U.S. Appl. No. 16/871,844; Notice of Allowance mailed Feb. 23, 2021.
U.S. Appl. No. 16/454,978; application filed Jun. 27, 2019; 57 pages.
U.S. Appl. No. 16/454,978; Office Action mailed May 8, 2020; 25 pages.
U.S. Appl. No. 16/454,978; Office Action mailed Sep. 22, 2020; 36 pages.
U.S. Appl. No. 16/528,376; Office Action mailed Feb. 17, 2021; (pp. 1-14).
U.S. Appl. No. 16/528,376; Office Action mailed Aug. 18, 2020, (pp. 1-11).
U.S. Appl. No. 16/871,844; Notice of Allowance mailed Mar. 23, 2021; (pp. 1-5).
U.S. Appl. No. 16/871,844; Notice of Allowance mailed Dec. 28, 2020; 38 pages.
U.S. Appl. No. 16/871,844; Notice of Allowance mailed Dec. 28, 2020; (pp. 1-10).
U.S. Appl. No. 16/528,376; Non-Final Rejection mailed Jan. 19, 2022; (pp. 1-12).
U.S. Appl. No. 16/528,376; Notice of Allowance and Fees Due (PTOL-85) mailed Jun. 14, 2022; (pp. 1-8).
U.S. Appl. No. 16/528,376; Notice of Allowance and Fees Due (PTOL-85) mailed Jul. 6, 2022; (pp. 1-3).
U.S. Appl. No. 16/528,376; Notice of Allowance and Fees Due (PTOL-85) mailed Jul. 20, 2022; (pp. 1-3).
U.S. Appl. No. 17/245,672; Non-Final Rejection mailed Jan. 31, 2022; (pp. 1-6).
U.S. Appl. No. 17/245,672; Notice of Allowance and Fees Due (PTOL-85) mailed May 2, 2022; (pp. 1-5).
U.S. Appl. No. 17/245,672; Notice of Allowance and Fees Due (PTOL-85) mailed Sep. 2, 2022; (pp. 1-2).
U.S. Appl. No. 17/405,671; Notice of Allowance and Fees Due (PTOL-85) mailed May 11, 2023; (pp. 1-5).
U.S. Appl. No. 17/879,927; Non-Final Rejection mailed May 23, 2023; (pp. 1-8).
U.S. Appl. No. 16/528,376; Office Action Dated Aug. 18, 2020; 34 Pages.
U.S. Appl. No. 16/871,844; Notice of Allowance dated Feb. 23, 2021; (pp. 1-6).
U.S. Appl. No. 16/843,119; Office Action mailed Feb. 2, 2021, 24 pages.
U.S. Appl. No. 16/843,119; Supplemental Notice of Allowability mailed May 25, 2021, 2 pages.
U.S. Appl. No. 16/843,119; Notice of Allowance mailed May 11, 2021, 5 pages.
Voydock, Victor L. and Kent, Stephen T. 'Security in High-Level Network Protocols', IEEE Communications Magazine, pp. 12-25, vol. 23, No. 7, Jul. 1985.
Voydock, Victor L. and Kent, Stephen T. 'Security Mechanisms in High-Level Network Protocols', Computing Surveys, pp. 135-171, vol. 15, No. 2, Jun. 1983.
Voydock, Victor L. and Kent, Stephen T. Security Mechanisms in a Transport Layer Protocol, pp. 325-341, Computers & Security, (1985).
Watts, Charles and Harper John. How to Design a HiSec.TM. Transmitter, pp. 1-4, National Semiconductor, (Oct. 1994).
Weinstein, S.B. Smart Credit Cards: The Answer to Cashless Shopping, pp. 43-49, IEEE Spectrum, (Feb. 1984).
Weissman, C. Security Controls in the ADEPT-50 Time-Sharing System, pp. 119-133, AFIPS Full Joint Computer Conference, (1969).
Welsh, Dominic, Codes and Cryptography, pp. 7.0-7.1, (Clarendon Press, 1988).
Wolfe, James Raymond, "Secret Writing—The Craft of the Cryptographer" McGraw-Hill Book Company 1970, pp. 111-122, Chapter 10.
YouTube Video entitled "How To Set up Tesla Model 3 Homelink . . . Super Easy !!!!" https://www.youtube.com/watch?v=nmmy4i7FO5M; published Mar. 1, 2018.
YouTube Video entitled Tesla Model X Auto Park in Garage (Just Crazy), https://youtu.be/BszlChMuZV4, published Oct. 2, 2016.

* cited by examiner

NETWORK-BASED CONTROL OF MOVABLE BARRIER OPERATORS FOR AUTONOMOUS VEHICLES

CROSS-REFERENCE TO RELATED APPLICATIONS

This is a continuation of U.S. patent application Ser. No. 17/384,149, filed Jul. 23, 2021, entitled NETWORK-BASED CONTROL OF MOVABLE BARRIER OPERATORS FOR AUTONOMOUS VEHICLES, which is a continuation of U.S. patent application Ser. No. 16/454,978, filed Jun. 27, 2019, entitled NETWORK-BASED CONTROL OF MOVABLE BARRIER OPERATORS FOR AUTONOMOUS VEHICLES, which issued as U.S. Pat. No. 11,074,773 on Jul. 27, 2021, which claims the benefit of U.S. Provisional application No. 62/690,624, filed Jun. 27, 2018, entitled NETWORK-BASED CONTROL OF MOVABLE BARRIER OPERATORS FOR AUTONOMOUS VEHICLES, which are all hereby incorporated by reference in their entireties herein.

FIELD

This disclosure relates to control systems for directing autonomous vehicles, and more specifically, to control systems for directing autonomous vehicles to vehicle storage areas.

BACKGROUND

Many people own or lease vehicles and store such vehicles in either a personal garage or a portion of a shared/communal resource such as a parking lot or garage. As the percentage of autonomous vehicles on roadways increases, the number of personally-owned vehicles may decrease and, as such, people will be less likely to have a vehicle parked in their garage or parking spot.

Many transportation as a service ("TaaS") companies, such as Lyft® and Uber®, exist today and are changing the automotive industry from one where individual consumers own vehicles to one where vehicles are provided as a service. Consumers now expect to have on-demand transportation with no more than a click of a button.

TaaS companies are currently developing autonomous vehicle fleets. Autonomous vehicles promise to reduce crashes, save lives, prevent traffic congestion, reduce fuel consumption, and improve land use. However, since these autonomous vehicles will be owned by service providers such vehicles will not have access to the infrastructures used to store personally-owned vehicles, and logistical problems of service and storage will arise when trying to meet consumers' expectation of on-demand transportation. For example, if storage of autonomous vehicles is centralized, wait times will increase and routing logistics become more complicated especially in times of high demand such as the morning commute.

DETAILED DESCRIPTION

Figure 1:
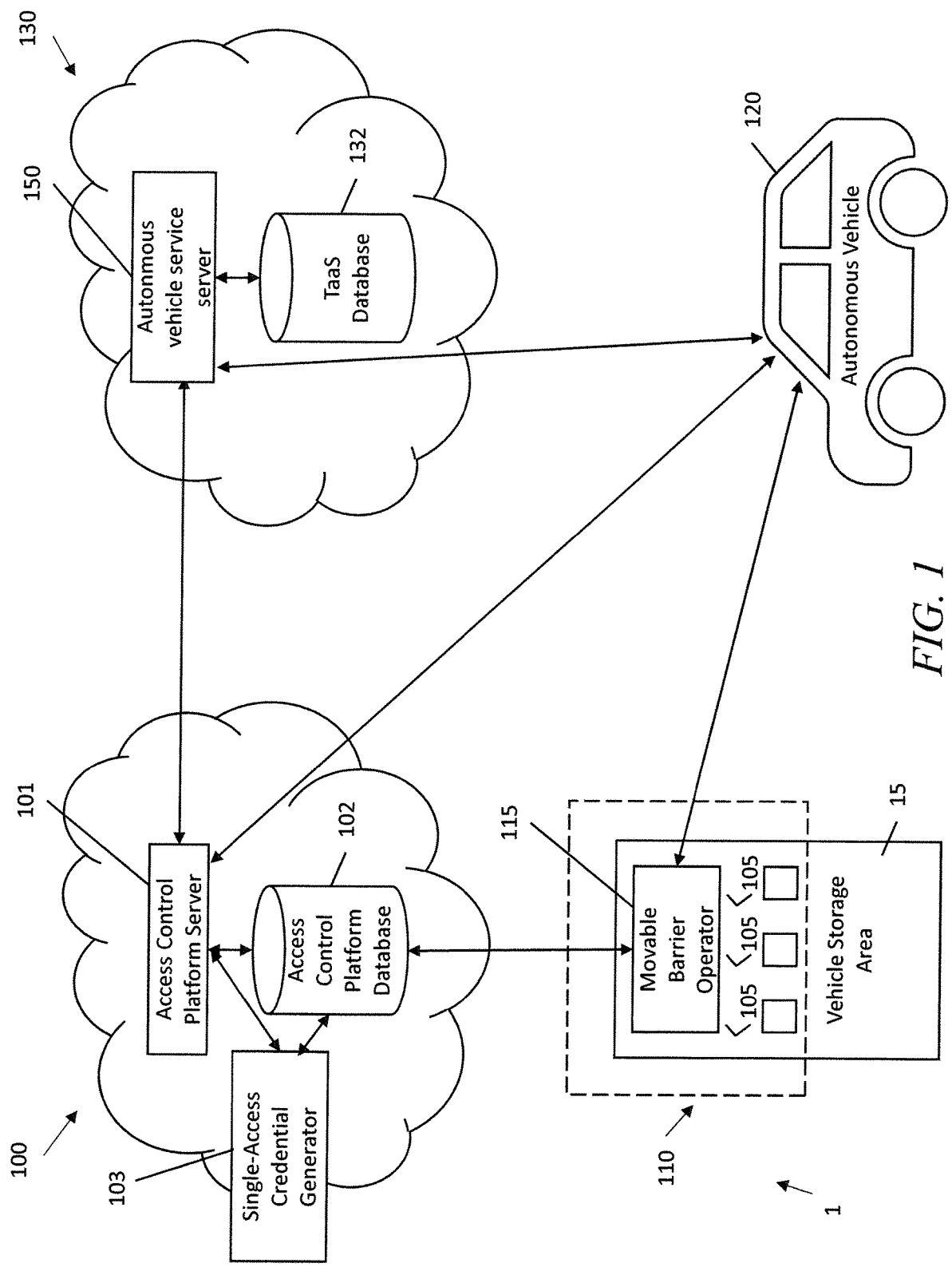
FIG. 1 is a block diagram of an example autonomous vehicle control system for enabling the temporary storage of autonomous vehicles in existing vehicle storage areas.

In one aspect of the present disclosure, an autonomous vehicle control system is provided that balances a consumer's expectation of having rapid on-demand transportation with the realities of implementing autonomous vehicles. The autonomous vehicle control system facilitates autonomous vehicles to be effectively and efficiently stored using existing infrastructures, like personal garages and parking spots. The autonomous vehicle control system allows a fleet of TaaS vehicles to be stored in existing infrastructures and to be efficiently dispersed in the existing infrastructures in order to meet consumer demand.

In accordance with another aspect of the present disclosure, an autonomous vehicle control system is provided that enables on-demand, temporary storage of autonomous vehicles in vehicle storage areas of existing infrastructures. The vehicle storage areas are each associated with one or more movable barrier operators configured to control access to the vehicle storage areas via one or more movable barriers. The autonomous vehicle control system includes an autonomous vehicle access control platform that is configured to enable access to the vehicle storage area such as by sending a single-use access credential to at least one of an autonomous vehicle and a movable barrier operator associated with the vehicle storage area. The single-use access credential may be generated by, for example, a single-use credential generator of an autonomous vehicle access control platform. The single-use credential generator may generate a single-use access control credential that is only valid to be used for a fixed period of time or, for example, only valid to be used in a window of time surrounding an estimated arrival time of the vehicle at a vehicle storage area.

The autonomous vehicle control system may pair an autonomous vehicle with a vehicle storage area for storage based at least in part on the location of the vehicle storage area relative to the autonomous vehicle. The autonomous vehicle control system may consider a number of other data when pairing an autonomous vehicle with a vehicle storage area. For example, the autonomous vehicle control system may consider the ability of an autonomous vehicle to make use of a charger in the vehicle storage area, the ability of an autonomous vehicle to access a wireless network of the vehicle storage area, the size of the vehicle storage area relative to the size of the vehicle, as well as the storage history of other vehicles that have used a particular vehicle storage area.

The autonomous vehicle control system improves the operation of autonomous vehicles by addressing resource expenditure (e.g., fuel as well as wear and tear on the vehicles) and time delay issues inherent in centralized storage solutions for autonomous vehicles. Moreover, the autonomous vehicle control system provides benefits to consumers that have unused vehicle storage areas as a result of their reliance on TaaS companies to meet those consumers' transportation needs. Specifically, users that have unused vehicle storage areas are able to monetize that vehicle storage area by allowing the autonomous vehicles to park in the vehicle storage area for the purposes of storage and service. When an autonomous vehicle uses a vehicle storage area provided by a user, the user is remunerated by the TaaS company who owns or is otherwise responsible for operating the autonomous vehicle.

The autonomous vehicle control system may include or access one or more data structures such as databases to store information related to vehicle storage areas. For example before an autonomous vehicle parks itself (or is otherwise parked) in a space of a vehicle storage area, the autonomous vehicle may collect data regarding the vehicle storage area and provide the collected data to the one or more databases. The collected data will be used by the autonomous vehicle control system to determine the suitability of the space for autonomous vehicle storage and service.

The autonomous vehicle control system may further use: data stored in the one or more databases by the user of the vehicle storage area; or data stored in the database by one or more electronic devices associated with the vehicle storage area, for example, one or more data collected by sensors such as image sensors, microphones, or hazardous gas detectors. For example, when a user creates a profile with the access control platform server that indicates the user's vehicle storage area is available for use by autonomous vehicles, the user may specify one or more pieces of information about themselves and/or the vehicle storage area. In the case of the one or more electronic devices supplying data, the data may be collected from one or more sensors or those one or more electronic devices.

The autonomous vehicle's collection of data related to a vehicle storage area may include determining whether parameters describing the physical dimensions of a particular vehicle storage area have been previously stored in a database and, if not, the autonomous vehicle may use one or more sensors (such as image-based or sound-based) to determine the physical dimensions. For example, the autonomous vehicle may determine the dimensions of the vehicle storage area and then communicate the dimensions of the vehicle storage area to the autonomous vehicle control system. The autonomous vehicle control system may then use the obtained dimensions of the vehicle storage area to pair autonomous vehicles to the vehicle storage area based on known dimensions of the autonomous vehicles and known dimensions of the vehicle storage area.

Such a determination of suitability provides a level of risk control or mitigation for TaaS companies. Because there is risk in storing an autonomous vehicle in a secured space not owned, managed or strictly under the control of the TaaS company, the TaaS company may desire an objective measure of the risk associated with storage at a particular vehicle storage area. For example, the autonomous vehicle, in addition to detecting the dimensions of the vehicle storage area, may determine the presence or absence of combustible materials, sprinkler systems, objects likely to fall on or otherwise damage the vehicle, and any other observable hazard that presents a storage risk to the autonomous vehicle. Any or all of these detected environmental conditions may be taken into consideration by the autonomous vehicle control system to determine the suitability or risk of storing an autonomous vehicle in a vehicle storage area. The autonomous vehicle control system may also use data that a user inputs into the profile associated with the vehicle storage area as well as data from the one or more electronic devices associated with the vehicle storage area to determine the suitability or risk associated with storing autonomous vehicle in a vehicle storage area.

A TaaS company may determine a risk profile, indicating a storage and service risk the the TaaS company is willing to tolerate, and the autonomous vehicle control system may pair an autonomous vehicle with a vehicle storage area based on the storage risk the TaaS company is willing to tolerate. Furthermore, upon arrival at a vehicle storage area, the autonomous vehicle may perform an independent risk analysis of the vehicle storage area to determine if the storage risk has changed—that is, whether a current risk is different than the storage risk previously calculated by the autonomous vehicle control system relative to environmental observations made by other autonomous vehicles. If the risk is different, the autonomous vehicle may reject the vehicle storage area, update the autonomous vehicle control system with new risk parameters, and request that the autonomous vehicle control system find a new vehicle storage area for the autonomous vehicle.

With reference to FIG. 1, an autonomous vehicle control system 1 is illustrated. The autonomous vehicle control system 1 includes an autonomous vehicle access control platform 100 that includes an access control platform server 101 connected to an autonomous vehicle service server 150 of a TaaS platform 130 and to a vehicle storage system 110. The access control platform server 101 may connect to the autonomous vehicle service server 150 and the vehicle storage system 110 over one or more networks such as the Internet. Optionally, the access control platform server 101 may also connect to and communicate directly with an autonomous vehicle 120, again, over one or more communications networks such as the Internet and/or wide-area (e.g., cellular phone communication) wireless systems. The access control platform server 101 may be configured to send, receive, associate, determine, and cause to be stored one or more status parameters, demographic data, access credentials, and vehicle storage system commands.

The vehicle storage system 110 may include one or more movable barrier operators 115 and one or more vehicle storage areas 15. The autonomous vehicle control system 1 is operable to direct a plurality of autonomous vehicle 120, such as dozens or hundreds of autonomous vehicles 120 in urban, suburban and rural areas, to any one of a plurality of vehicle storage areas 15, such as dozens or hundreds of home garages owned by users. The autonomous vehicle control system 1 also facilitates operation of the movable barrier operators 115 associated with the vehicle storage areas 15 once the autonomous vehicles 120 arrive at the vehicle storage areas 15.

The vehicle storage system 110 may include one or more access control devices 105. In one embodiment, the one or more access control devices 105 include a lock of a passageway door that opens to the vehicle storage area 15. In a commercial setting with multiple vehicles in a vehicle storage area, the access control devices 105 may include locks that restrict movement of vehicles in the vehicle storage area 15. The one or more access control devices 105 may be configured to communicate over a network such as the Internet. The access control devices 105 of the vehicle storage platform 110 may also be networked to each other and to the movable barrier operator 115 in a peer-to-peer ad hoc fashion using a short-range communication protocol such as, Zigbee®, Bluetooth® (or Bluetooth Low Energy (BLE)), or Near Field Communications (NFC), or Wi-Fi with at least one of the access control devices 105 of the vehicle storage platform 110 being able to access a communication network such as the Internet. The one or more access control devices 105 may also be in communication with one or more movable barrier operators 115.

Figure 2:
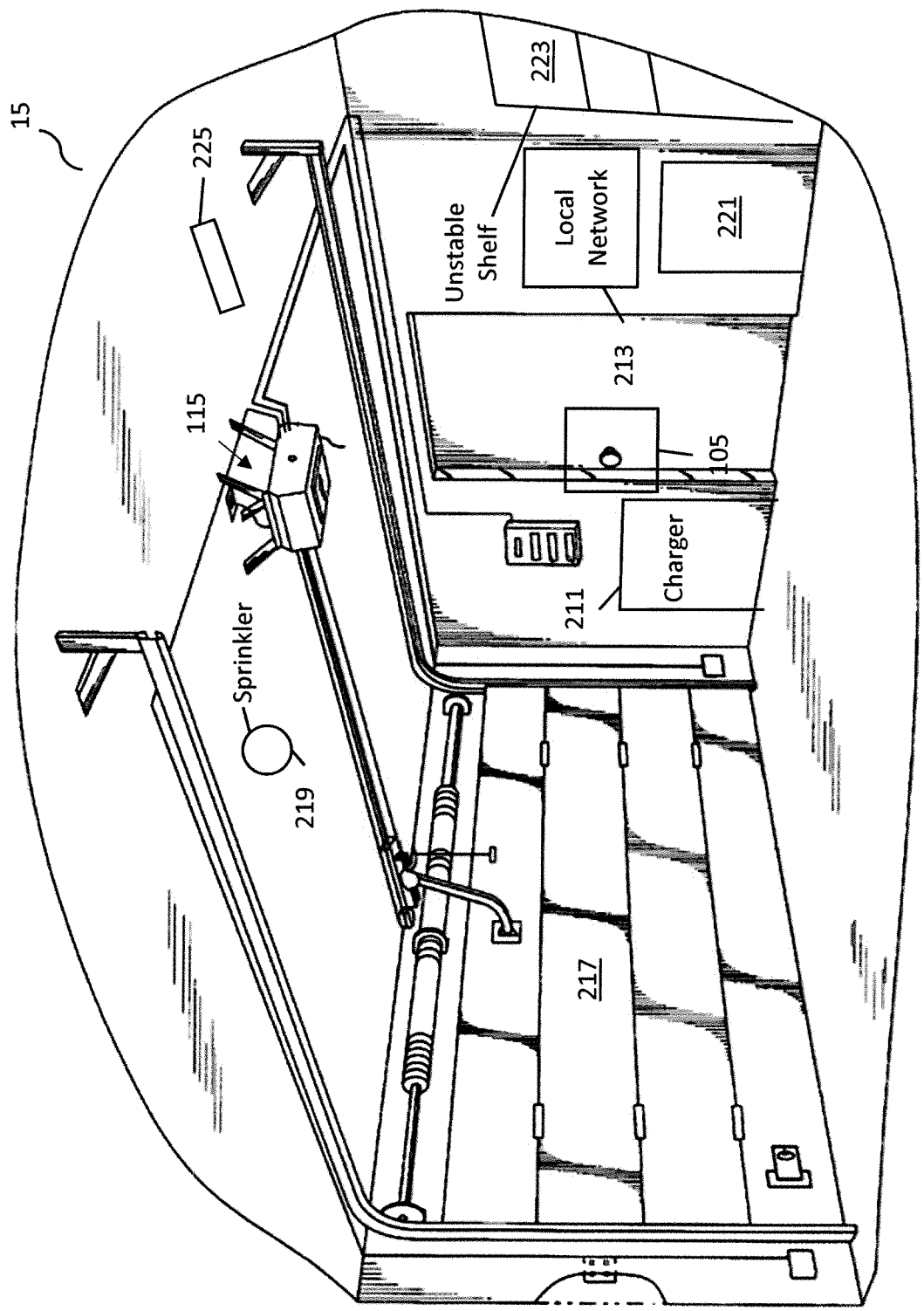
FIG. 2 is a perspective view of an example vehicle storage area having various conditions that increase or decrease the risk, or desirability, associated with parking an autonomous vehicle in the vehicle storage area.
Figure 7:
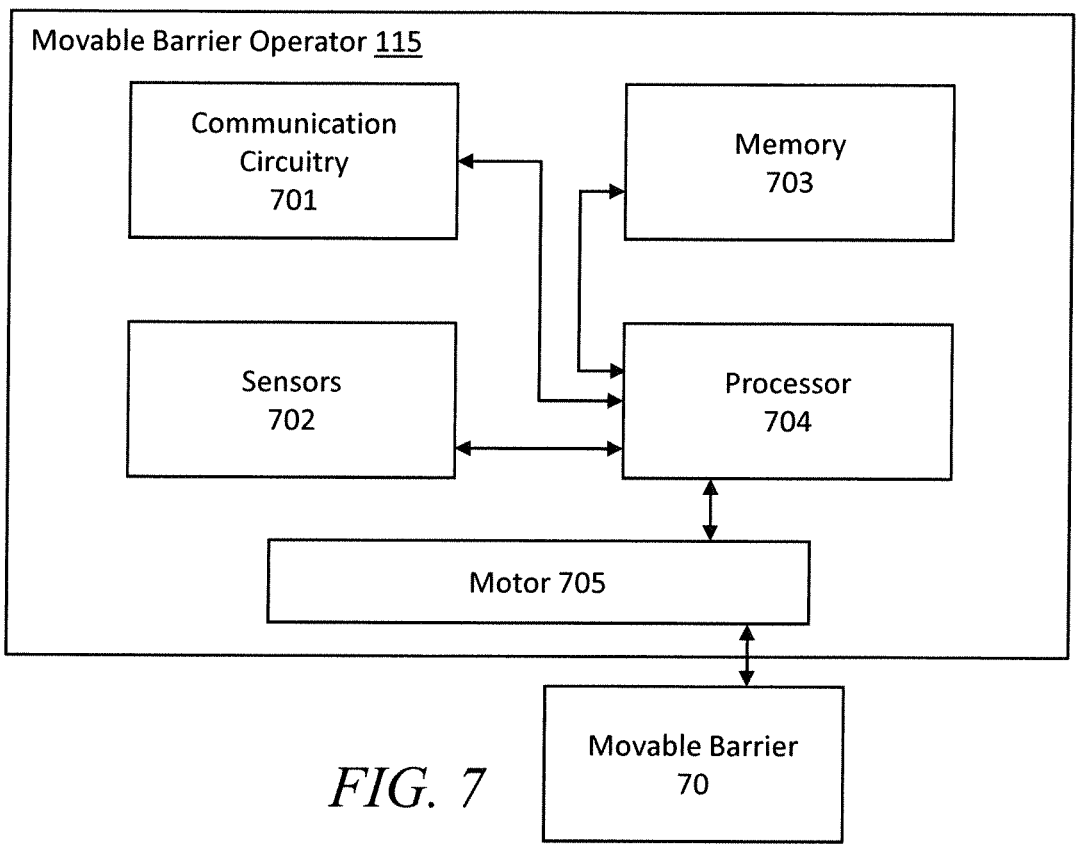
FIG. 7 is a functional-block diagram of an example movable barrier operator of the system of FIG. 1.

As shown in FIG. 2, the movable barrier operator 115 may be, for example, a garage door opener that adjusts the position of a segmented garage door 217 to control access to the vehicle storage area 15. In other embodiments, the movable barrier operator 115 may be configured to shift or swing a gate as some examples. As shown in FIG. 7, the movable barrier operator 115 may have a processor 704 operatively connected to a memory 703, communication circuitry 701, a motor 705 configured to raise and lower or otherwise move a movable barrier 70 such as a gate or a door (e.g., garage door 217), and one or more sensors 702. The one or more sensors 702 may detect one or more environmental conditions of the vehicle storage area 15. For example, the one or more sensors 702 may detect the presence of smoke, heat, flames, carbon monoxide, excess humidity, the presence of standing water, the presence of an obstacle in a space designated for an autonomous vehicle, or any other environmental factor that affects the suitability of the vehicle storage area 15 for use by the autonomous vehicle 120. The movable barrier operator 115 may transmit the environmental conditions to the autonomous vehicle access control platform 100 and/or the autonomous vehicle service server 150.

Figure 3:
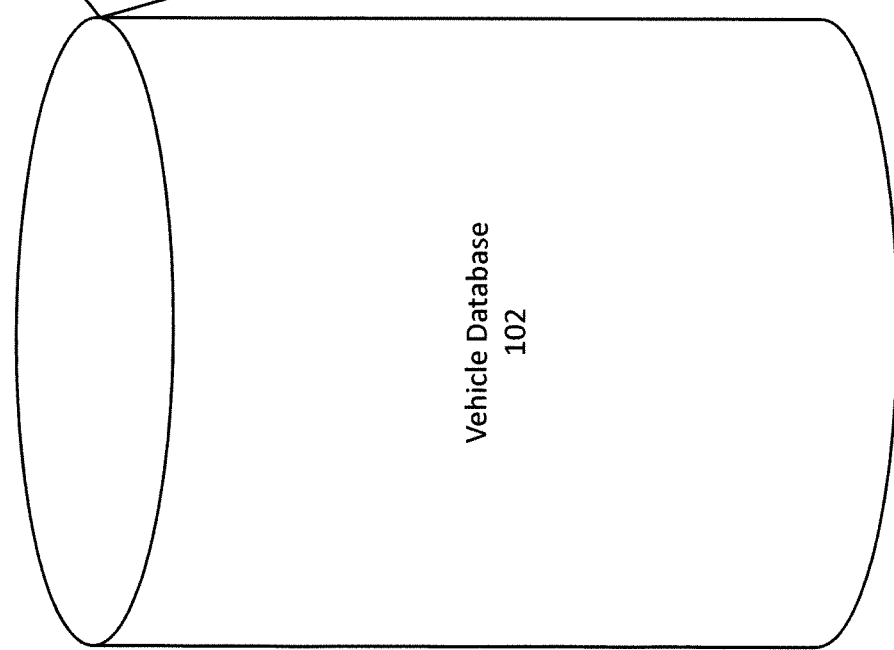
FIG. 3 is a schematic view of an example of a data structure of the autonomous vehicle control system of FIG. 1 storing various data related to a vehicle storage area.

The access control platform server 101 may be operatively connected to a memory of the access control platform 100 containing an access control platform data structure such as database 102 (FIG. 3). The database 102 stores one or more status parameters, such as environmental conditions sensed by the one or more sensors 702, risk scores, secure space IDs, physical parameters such as area or volume (e.g., length, width and height) of the vehicle storage area 15, demographic data, access credentials, or commands from the access control platform server 101. The access control platform database 102 may further store one or more user accounts associated with one or more vehicle storage platforms 110 and profiles of one or more vehicle storage areas 15 provided by one or more users. The one or more status parameters, risk scores, vehicle storage area condition parameters, vehicle storage area IDs, physical parameters of a vehicle storage area, demographic data, access credentials, and commands stored in the access control platform database 102 may be associated with one or more of the stored user accounts. Any or all of the parameters described as being stored in the access control platform database 102 may also be stored in a memory of the TaaS platform 130, such as a memory containing TaaS database 132.

The status parameters may further include parameters such as the geographical location (e.g., GPS coordinates, street address, etc.) and operating status of one or more movable barrier operators 115 associated with a user account; the presence or absence of one or more peripheral devices, such as charging devices and WiFi access points, in the one or more vehicle storage area 15 controlled by the one or more movable barrier operators 115; rates offered by one or more users for use of one or more vehicle storage areas 15; and an indication of whether or not the vehicle storage areas 15 are currently occupied.

The access control platform database 102 may further store one or more risk scores for one or more of the vehicle storage areas 15. For example, the access control platform database 102 may associate a risk score with a vehicle storage area ID. A secure space ID is an identifier that uniquely identifies a vehicle storage area 15. The risk score may be determined and output by a risk calculation process implemented on either the access control platform server 101 or the TaaS platform 130, or a combination thereof.

The risk calculation may be embodied in or otherwise performed by, for example, a single layer neural expert system, a multilayer neural expert system, or a neuro-fuzzy system having one or more processes under control. For example, the risk calculation may be implemented to control the process of determining the risk score using one or more parameters stored in at least one of the access control platform database 102 and the TaaS database 132 and/or one or more vehicle storage area condition parameters received from at least one of the movable barrier operator 115 and the autonomous vehicle 120.

With reference to FIG. 2, the vehicle storage area parameters may indicate one or more conditions present in the vehicle storage area 15. The one or more conditions identified as being present by the vehicle storage area conditions parameters may include identification of the position of one or more objects that could fall on or otherwise damage the autonomous vehicle 120 such as a loose ceiling tile 225 or a unstable shelf 223; the presence of risk mitigation devices such as sprinklers 219 or other fire extinguishers; and the presence of hazardous materials such as hazardous materials 221. The hazardous materials 221 may include, for example, flammable chemicals.

Figure 4:
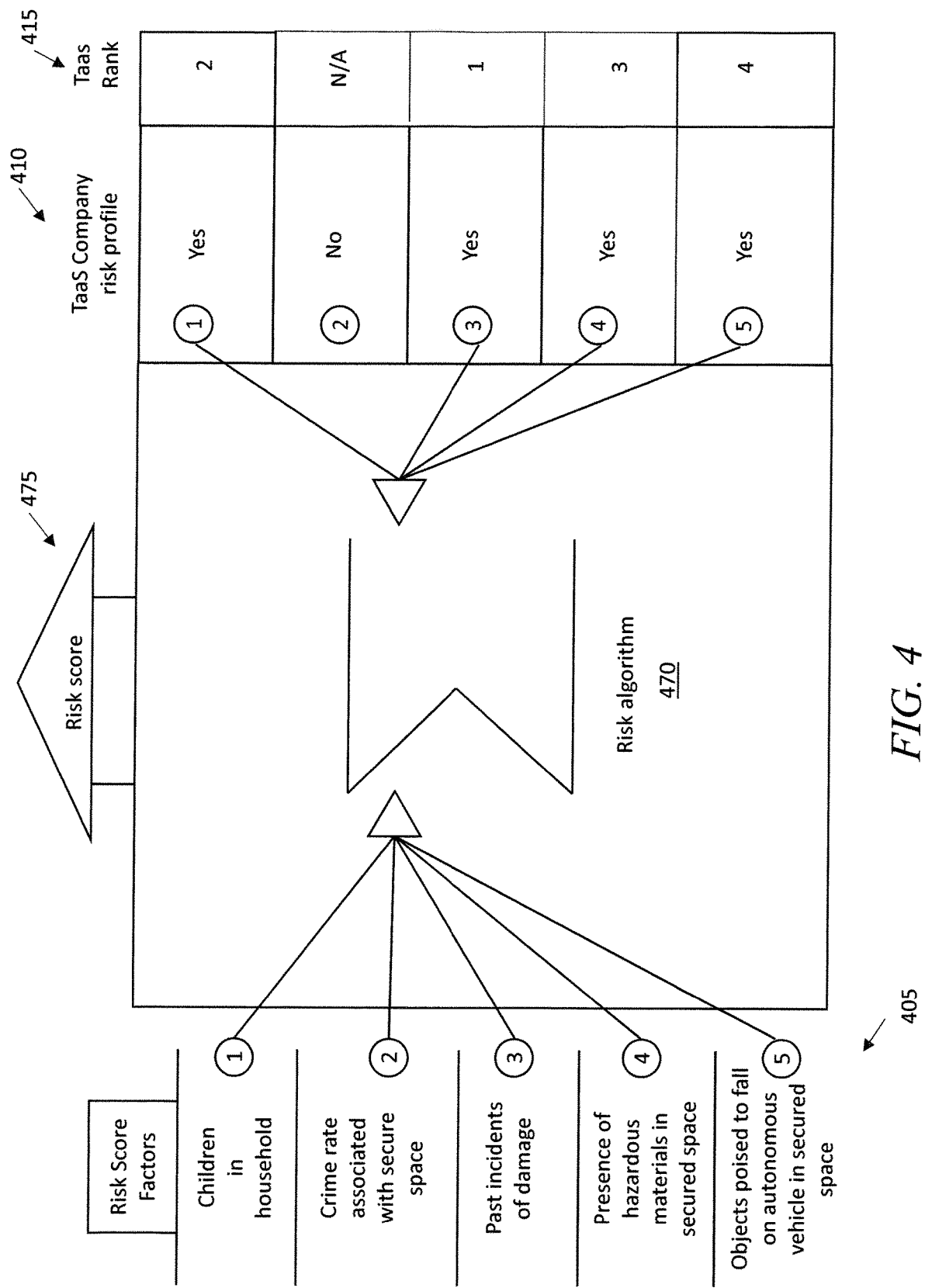
FIG. 4 illustrates an example TaaS company risk profile of a vehicle storage area created from available risk score factors.

The risk score factors that are input into the risk calculation may be customizable based on the needs or risk tolerance of a particular TaaS company. For example, FIG. 4 provides a risk algorithm 470 that allows the TaaS company to create a TaaS company risk profile 410 by selecting and/or ranking, using for example a TaaS rank 415, in importance one or more risk score factors 405 such as presence of children in a household, crime rate associated with the neighborhood in which the vehicle storage area 15 is located, past incidence of damage to autonomous vehicles 120 parked in the vehicle storage area 15, the presence of hazardous materials in the vehicle storage area 15, and the presence of objects poised to fall on the autonomous vehicle in the vehicle storage area 15. Each of the selected risk parameters and their importance may then be input into the risk algorithm to determine a risk score 475 for a vehicle storage area 15.

Figure 5:
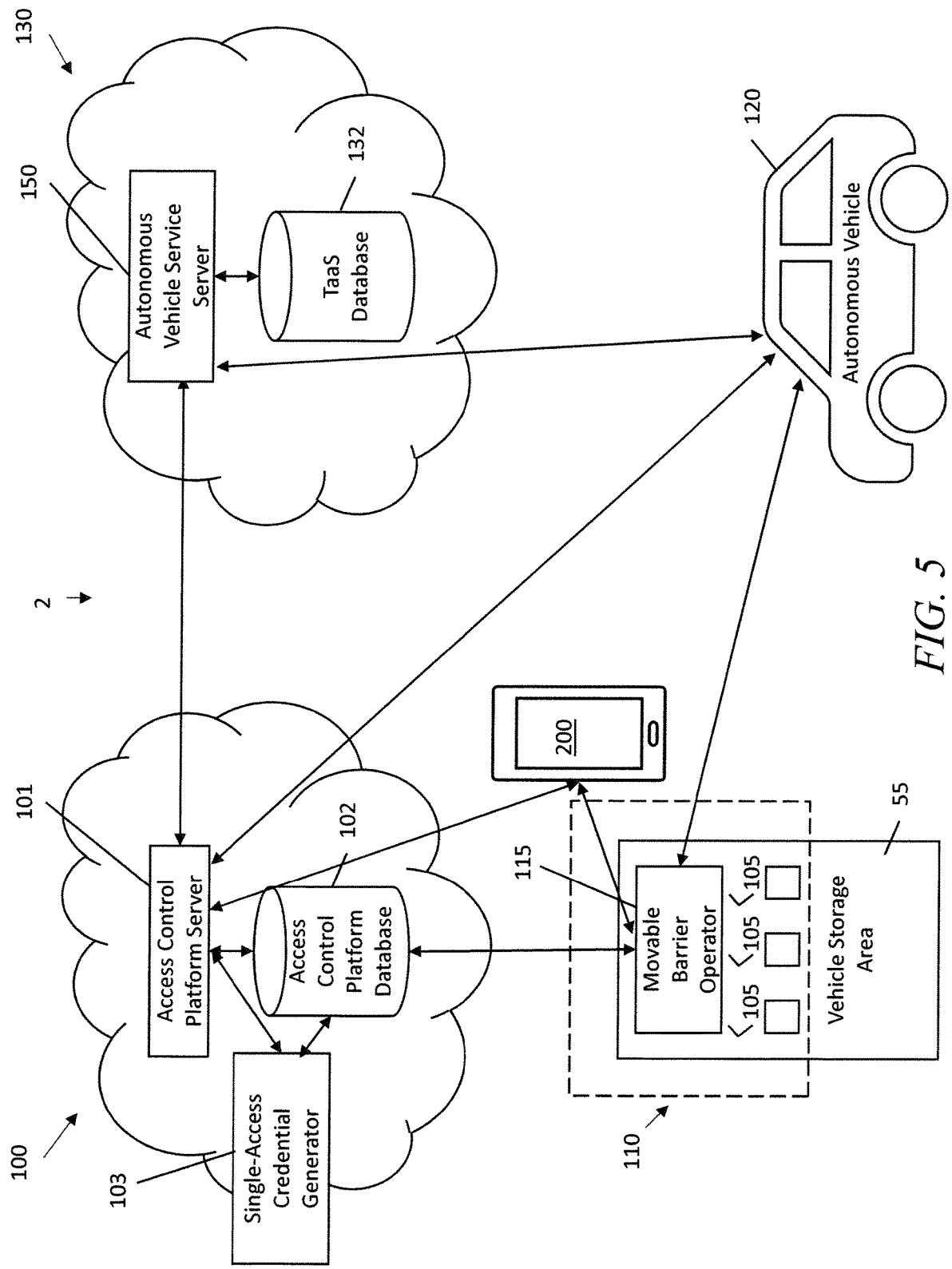
FIG. 5 is a block diagram of another example autonomous vehicle control system implemented as an authorized user-in-the-loop control system.

With reference to FIG. 5, an authorized user-in-the-loop autonomous vehicle control system 2 is provided that is similar in many respects to the autonomous vehicle control system 1 and shares many of the same components. The autonomous vehicle control system 2 includes a user device 200 connected to any or all of the access control platform server 101, the movable barrier operator 115, the autonomous vehicle 120, and the TaaS platform 130. The user device 200 may be a device such as a smartphone, tablet computer, personal computer, or other electronic computing device capable of network communication.

A user may set the ask price for use of the vehicle storage area 15 using the user device 200. For example, after setting up a user account and creating a profile of the vehicle storage area 15, the user can make the vehicle storage area 15 available for use by autonomous vehicles 120. The user may set an ask price for the vehicle storage area 15. The ask price is the price the user requests in exchange for use of the vehicle service area 15 by an autonomous vehicle 120 of the fleet of the TaaS service.

The user device 200 includes a user interface that permits the user to set up a user account, set up a profile for the vehicle storage area 15, and set the ask price of the vehicle storage area 15. The user interface may also display other data to the user such as average ask price for other vehicle storage areas 15 in the neighborhood or area surrounding the vehicle storage area 15. The user interface of user device 200 may additionally be employed by the user to select various options such as: whether the ask price is fixed or variable (and additionally a range of ask prices such as a minimum and/or maximum); and whether the platform 100 may solicit bids (e.g., via a Dutch auction or ascending price auction) for use of the user's vehicle storage area 15 by a specific autonomous vehicle or for TaaS-exclusive use such as an extended or recurring basis.

After the user sets the ask price for their vehicle storage area 15 using the user device 200, the user device 200 communicates the ask price to at least one of the access control platform server 101 and the autonomous vehicle service server 150. The ask price may then be stored in at least one of the access control platform database 102 and the TaaS database 132. For example, the user may enter an ask price for use of the vehicle storage area 15 using the user device 200 and the user device 200 may transmit the ask price to the access control platform server 101. The access control platform server 101 may then store the ask price in the access control platform database 102 in association with the secured space ID of the vehicle storage area 15 for which the user set the ask price.

Figure 6:
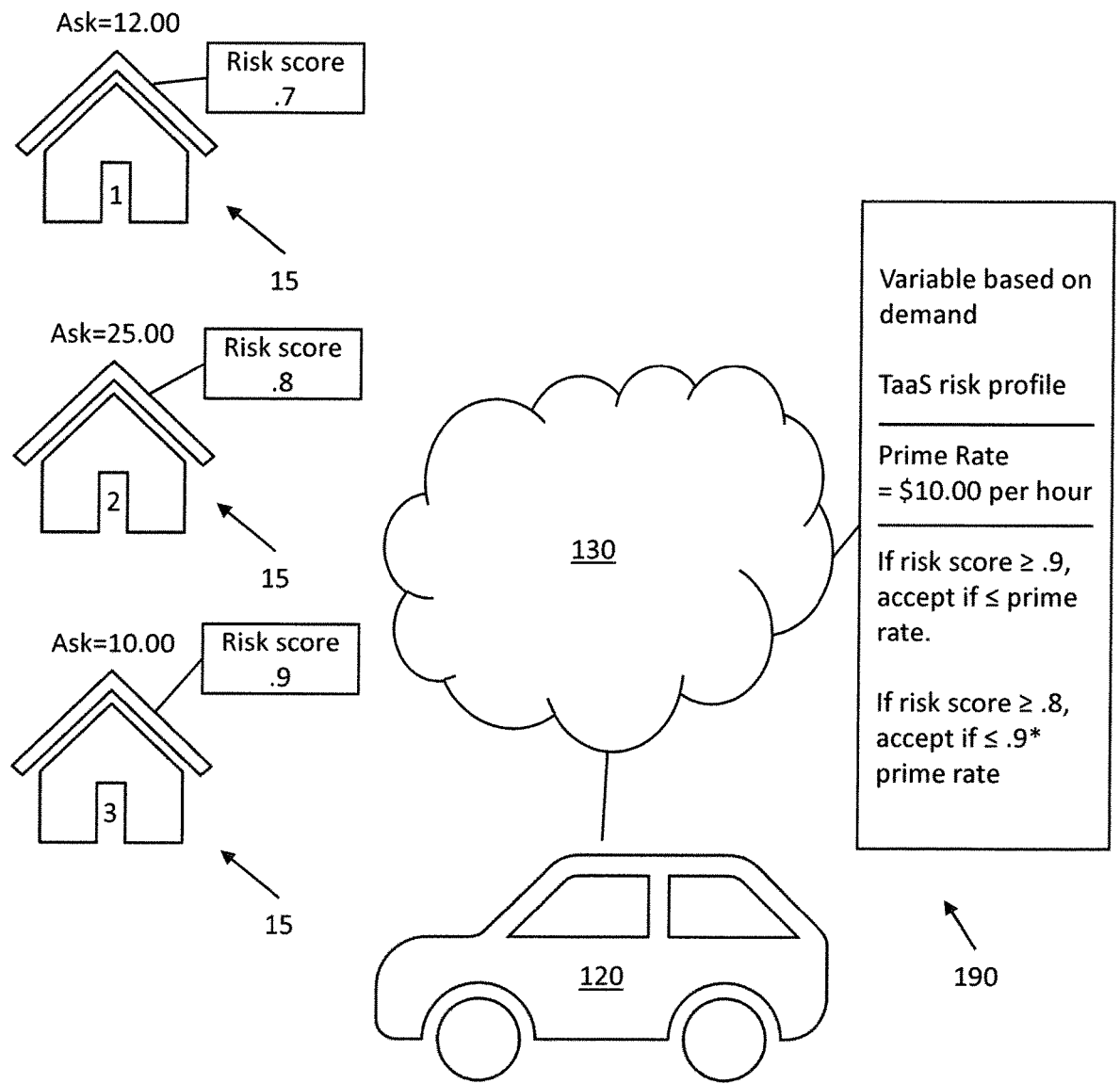
FIG. 6 is a schematic view of a network computing device enabled to determine which vehicle storage area to direct an autonomous vehicle to based on a price-risk function.

The autonomous vehicle 120 may make a parking or access request to either the access control platform server 101 or the autonomous vehicle service server 150. In the case that the autonomous vehicle 120 makes a parking request to the autonomous vehicle service server 150, the autonomous vehicle service server 150 may request information regarding a vehicle storage area 15. The requested information may include the ask price the user set for the vehicle storage area 15 and the risk score associated with the vehicle storage area 15. The autonomous vehicle service server 150, upon receipt of the ask price and the risk score, may determine which of the vehicle storage areas 15 to direct the autonomous vehicle 120 to park in based on a risk-pricing function. An example risk-pricing function 190 is shown in FIG. 6, however other suitable functions that balance price and risk may be employed.

Figure 8:
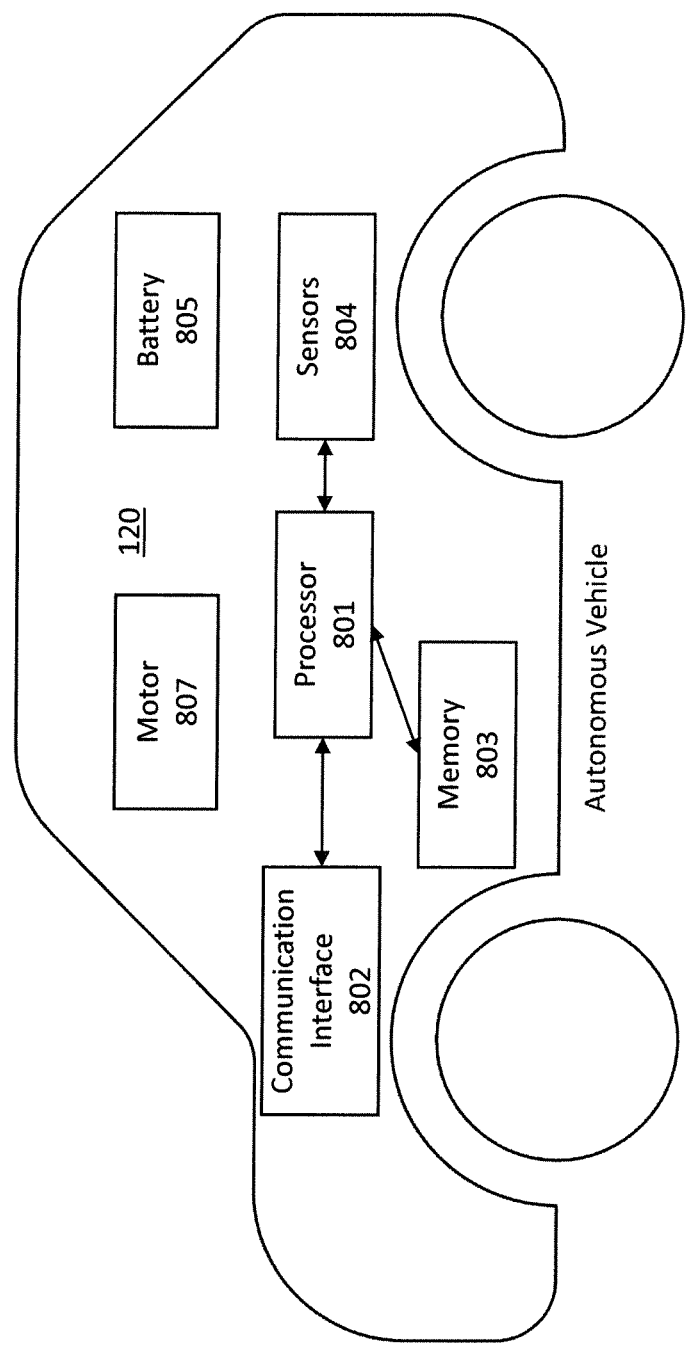
FIG. 8 is a functional-block diagram of an example autonomous vehicle.

Regarding FIG. 8, the autonomous vehicle 120 may have a processor 801 coupled or connected to a memory 803 and one or more sensors 804 for sensing the environment external to the autonomous vehicle 120 such as the physical dimension of a vehicle storage area and observable hazards such as unstable shelf 223, hazardous materials 221, and loose ceiling tile 225. Likewise, the autonomous vehicle 120 may have a battery 805 that powers any or all of the processor 801, the communication interface 802, the memory 803, the one or more sensors 804, and one or more drive motors 807 for propelling the autonomous vehicle 120. As can be appreciated, the autonomous vehicle 120 may be a plug-in electric vehicle, a plug-in hybrid electric/IC (internal combustion) vehicle, a hybrid electric vehicle, or an internal combustion vehicle. Additionally the autonomous vehicle 120 may be a "connected" car such that the communication interface 802 facilitates receipt and transmission of messages, information, signals, and the like via a wide-area network (e.g., cellular terrestrial, satellite, etc.). Alternatively or additionally, the communication interface 802 may be configured for short range communications with proximate objects (e.g., other vehicles, transportation system infrastructure, pedestrians, etc.) via peer-to-peer or ad-hoc mesh networks using one or more of vehicle-to-vehicle (V2V), vehicle-to-infrastructure (V2I), vehicle-to-anything (V2X) protocols. The autonomous vehicle 120 may be either fully autonomous or semi-autonomous. A fully autonomous vehicle is a self-driving, driverless vehicle that can operate without a human driver in the vehicle or operating the vehicle remotely. A semiautonomous vehicle is a vehicle that can operate autonomously when performing certain functions but can utilize human intervention, either by a driver in the vehicle or a remote driver, for certain other functions. Although the autonomous vehicle 120 is shown as a wheeled, terrestrial car or truck, nevertheless the autonomous vehicle may alternatively or additionally be embodied as an aerial vehicle, a watercraft, or a combination land/water/air vehicle. Accordingly the vehicle storage area 15 may additionally or alternatively be embodied as a boat slip, a helipad, a hangar or combinations/portions thereof to which access is controlled via a barrier and movable barrier operator.

Figure 9:
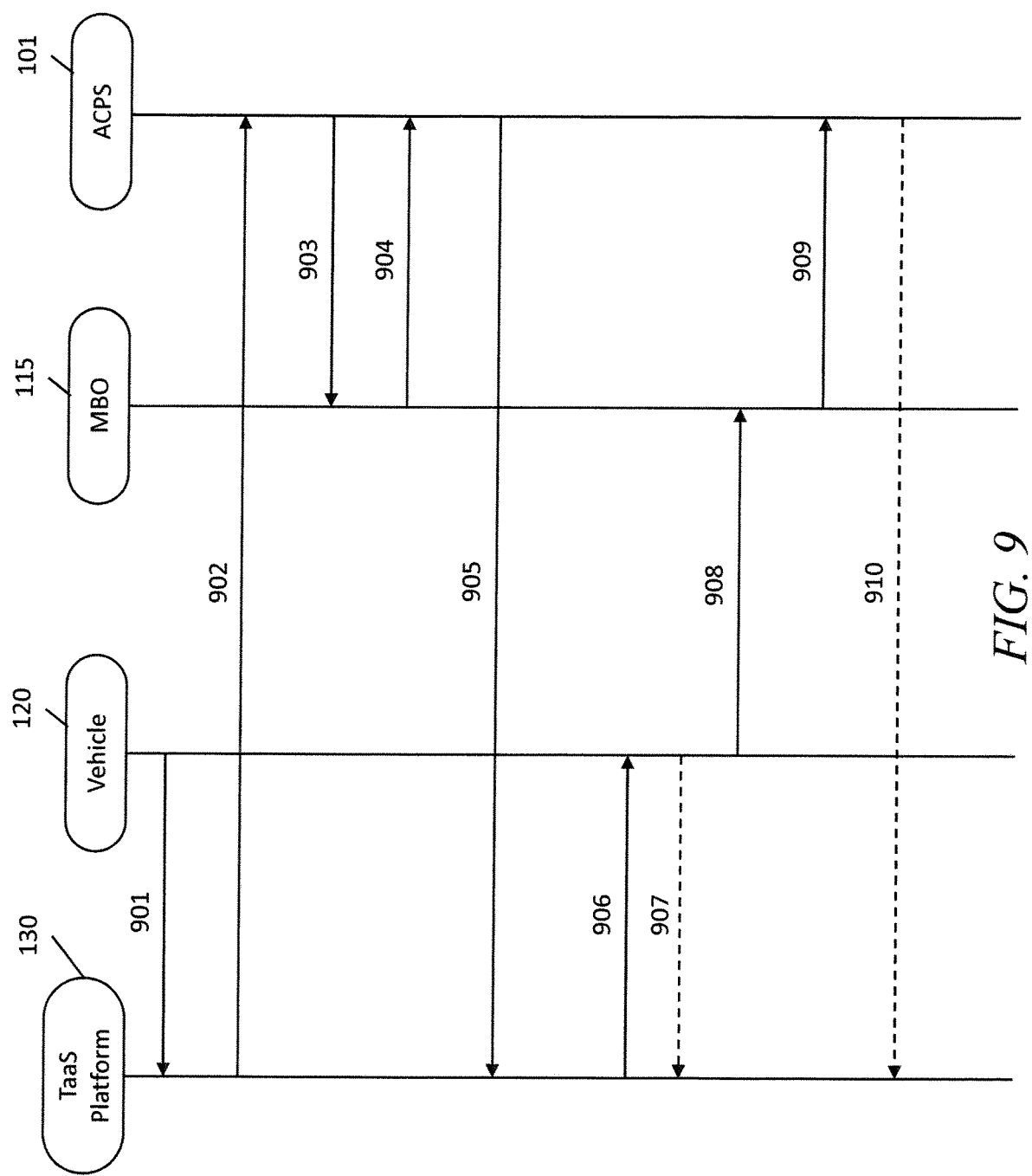
FIG. 9 illustrates a first example communication flow between devices of the control system of FIG. 1.

In order for the autonomous vehicle 120 to operate (or cause operation of) the movable barrier operator 115 and gain access to the vehicle storage area 15, the access control platform server 101 may communicate a single-use access credential, such as a temporary access credential, to the autonomous vehicle 120 that is configured to operate the movable barrier operator 115. The single-use access credential may be selected (e.g., from a list) or otherwise created, generated or instantiated by single-access credential generator 103 as shown in FIGS. 1 and 5 using various techniques that include, for example, rolling or changing codes known in the art. The single-use access credential improves the security of the home, business, or other area associated with the vehicle storage area 15 when a user decides to make the vehicle storage area 15 available for use by autonomous vehicles 120. FIG. 9 illustrates an example of a communication flow of a single-use access credential between the devices of the autonomous vehicle control system 1 of FIG. 1. In operation 901, the vehicle 120 may communicate with the TaaS platform 130 to request that the TaaS platform 130 direct the autonomous vehicle 120 to a vehicle storage area 15. In operation 902, after the TaaS platform 130 determines (e.g., using risk calculation/algorithm 170 and/or risk-pricing function 190) a vehicle storage area 15 for the autonomous vehicle 120 to be stored in, the TaaS platform 130 may request access credentials allowing it to operate the movable barrier operator 115 associated with the vehicle storage area 15 from the access control platform server 101. Alternatively, in operation 902, the TaaS platform 130 may forward the access request to the access control platform server 101 without determining a vehicle storage area 15 and instead the access control platform server 101 may determine the vehicle storage area 15 and associated movable barrier operator 115.

In operation 903, the access control platform server 101 may send an access credential request to the movable barrier operator 115 associated with the determined vehicle storage area 15. Upon receipt of the access credential request, the movable barrier operator 115 may generate a single-use access credential and send the single-use access credential to the access control platform server 101 in operation 904. The movable barrier operator 115 additionally or alternatively transmits the single-use access credential to the TaaS platform 130. Instead of sending the access credential request to the movable barrier operator 115 in operation 903, the access control platform server 101 may, itself, determine the single-use access credential and in operation 903 the access control platform server 101 may send the single-use access credential to the movable barrier operator 115. In operation 904, the movable barrier operator 115 may acknowledge that it has received the single-use access credential.

The single-use access credential may be a temporary access credential that is valid for only a set amount of time. For example, the TaaS platform 130 may calculate an expected arrival time of the autonomous vehicle 120 at the vehicle storage area 15 based on the current location of the autonomous vehicle 120 and the TaaS platform 130 may request that the access control platform server 101 or movable barrier operator 115 generate a temporary access credential based on the calculated arrival time. As will be described in more detail below, when autonomous vehicle 120 arrives at a vehicle storage area 15, the autonomous vehicle 120 will transmit the temporary access credential to the movable barrier operator 115 to open the associated movable barrier and allow the autonomous vehicle 120 to access the vehicle storage area 15. The access control platform server 101 may validate the temporary access credential only in, for example, a 15-minute window surrounding the estimated arrival time. Alternatively, the temporary access credential may be valid for a set period of time after it is requested such as 10, 15, or 20 minutes. The set period of time may be any length of time.

The calculated arrival time may be encrypted and used as the temporary access credential. The calculated arrival time may be encrypted using a homomorphic encryption algorithm. As such, changes in arrival time may be added or subtracted from the originally calculated arrival time without decrypting the temporary access credential. For example, if the originally calculated arrival time is 4:30 pm and the access control platform server 101 sent (4:30 pm) encrypted to either or both of the movable barrier operator 115 and the autonomous vehicle 120 as the temporary access credential and if the TaaS platform 130 determines that it will take 15 minutes longer to reach a secured space than originally calculated, the TaaS platform 130 may send (+15 minutes) encrypted to either or both of the movable barrier operator 115 and the autonomous vehicle 120 and the temporary access credential can be updated without decrypting the temporary access credential or requesting that the access control platform server 101 generate a new temporary access credential. This allows the window surrounding the arrival time to be as small as possible and increases security because the temporary access credential can be updated and the window can be shifted without retransmitting the entire temporary access credential. The TaaS platform 130 may determine whether an individual or aggregate arrival time change places the arrival time outside the window of the originally calculated arrival time and update the temporary access credential only if the change in arrival time places the arrival outside the window.

In another example, the single-use access credential may be a temporary access credential that is derived from information associated with the autonomous vehicle. For instance, the temporary access credential may be a numeric or alphanumeric code resulting from performance of a hash function on an identifier such as a VIN (vehicle identification number), MAC (media access control) address, IP (internet protocol) address or the like that is at least one of specific and substantially unique to the autonomous vehicle. To this end, the access control platform server 101 may: retrieve or receive vehicle-specific information from the data structure 102; hash an identifier or identifiers associated with the autonomous vehicle; and communicate (e.g., via a message of operation 904 of FIG. 9) the hashed identifier(s) to a barrier operator such that, upon arrival of the autonomous vehicle 120 at the storage area 15, the barrier operator 115 compares a newly-received identifier (or hashed version thereof) from/of the autonomous vehicle with a previously-received hashed identifier of operation 904. In view of the foregoing the temporary access credential may only be communicated to the barrier operator 115 rather than the vehicle 120 and the barrier operator thereby conserving resources in the system 1.

In yet another example an asymmetric cryptographic technique may be employed in which a public key of the autonomous vehicle 120 is stored by the access control platform server 101 or data structure 102. Accordingly the vehicle's public key may be communicated to barrier operator in operation 903 such that use of a private key by the vehicle facilitates access to a storage area 15 associated with the barrier operator.

Prior to the movable barrier operator 115 providing the temporary access credential to the access control platform server 101 in operation 904, the user offering the vehicle storage area 15 associated with the movable barrier operator 115 for use may be sent a permission request requesting permission to grant a temporary access credential to the autonomous vehicle 120. If the user indicates that a temporary access credential should be granted, using for example the user device 200 (see FIG. 5), then the access control platform server 101 will generate and send the temporary access credential.

In operation 905, the access control platform server 101 may send the TaaS platform 130 the temporary access credential, and in operation 906 the TaaS platform 130 may relay or otherwise send the temporary access credential to the autonomous vehicle 120 and/or the movable barrier operator 115. Optionally, in operation 907, the autonomous vehicle 120 may send a message acknowledging receipt of the temporary access credential to the TaaS platform 130. Alternatively, or additionally, the autonomous vehicle 120 may send the message acknowledging receipt of the temporary access credential to the access control platform server 101.

In operation 908, the autonomous vehicle 120 may send a command signal, such as a request to move (e.g., open or close) a barrier and/or actuate a barrier operator 115, including the temporary access credential to the movable barrier operator 115 of the vehicle storage system 110 to open a movable barrier, such as the garage door 217 (see FIG. 2) controlled by the movable barrier operator 115. In operation 909, the movable barrier operator 115 may send a message or notification to the access control platform server 101 indicating that the autonomous vehicle 120 has used the temporary access credential and, optionally, in operation 910 the access control platform server 101 may relay or otherwise send the message or notification to the TaaS platform 130 to allow the TaaS platform 130 to reconcile billing. The notification permits the TaaS platform 130 to confirm that the autonomous vehicle 120 is using the vehicle storage area 115 to which the TaaS platform 130 directed the autonomous vehicle 120.

Figure 10:
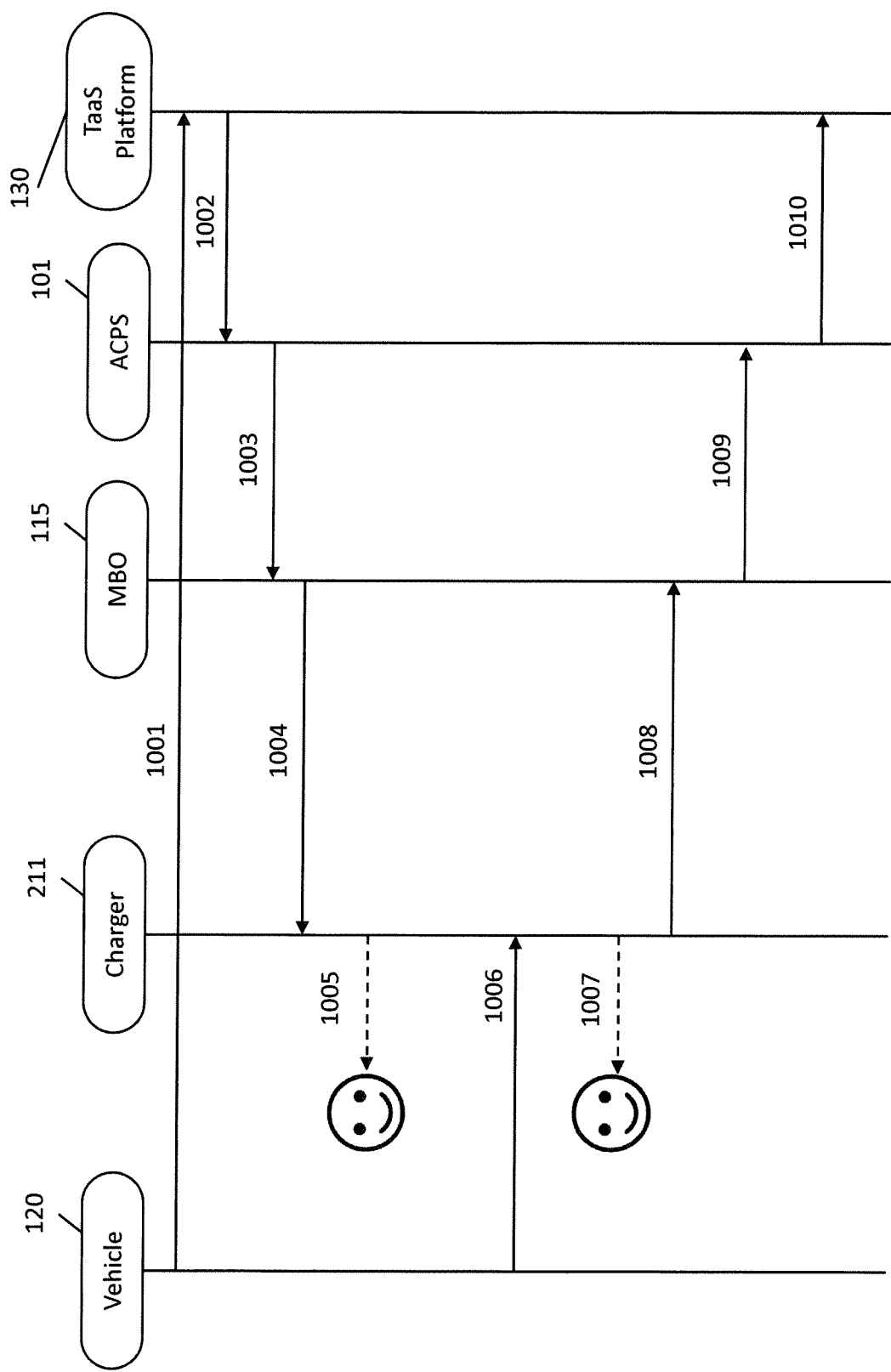
FIG. 10 illustrates a second example communication flow between the devices of the control system of FIG. 5.

FIG. 10 illustrates an example of a communication flow between the devices of the autonomous vehicle control system 1 to facilitate charging of the autonomous vehicle 120 while the autonomous vehicle 120 is stored in the vehicle storage area 15. In operation 1001, the autonomous vehicle 120 sends a charging request to the TaaS platform 130 requesting that the battery 805 of the autonomous vehicle 120 be charged. In operation 1002, the TaaS platform 130 may relay or otherwise send the charging request to the access control platform server 101. The access control platform server 101 may then determine whether the vehicle storage area 15 is capable of charging the autonomous vehicle 120. If the access control platform server 101 determines that the vehicle storage area 15 is capable of charging the autonomous vehicle 120, the access control platform server 101 may authorize a charger 211 (FIG. 2) of the vehicle storage area 15 to be used by the autonomous vehicle 120. If the vehicle storage area 15 is not capable of charging the autonomous vehicle 120, the autonomous vehicle 120 may request that the autonomous vehicle control system 1 find a vehicle storage area 15 in which the autonomous vehicle 120 may be charged.

In operation 1003, the access control platform server 101 may send the charging request to the movable barrier operator 115. Alternatively, in operation 1003, the access control platform server 101 may send the charging request directly to the charger 211 of the vehicle storage area 15, or to a charging network associated with the charger 211.

In operation 1004, the movable barrier operator 115 may send the charging request to the charger 211 of the vehicle storage area 15 or to a charging network associated with the charger 211. Optionally, in operation 1005 a user or another party associated with the vehicle storage area 15 may be notified, by, for example, sending a message to the user device 200, to connect the charger 211 to the autonomous vehicle 120. However, in other instances when the charger 211 is a wireless (inductive) power station, at least one of the access control platform server 101, the barrier operator 115 and the vehicle 120 may cause the charger 211 to be activated or energized for vehicle charging without human intervention. In operation 1006, the autonomous vehicle 120 may notify the charger 211 or charging network that charging is complete. If human intervention for charging occurred in operation 1005, optionally in operation 1007, the user or another party associated with the vehicle storage area 15 may be notified, by for example sending a message to the user device 200 (FIG. 5), to disconnect the charger 211 from the autonomous vehicle 120. Alternatively if no human intervention was employed for charging, the charger 211 may be deactivated or de-energized after receipt of a message, signal or notification from vehicle 120.

In operation 1008, the charger 211 may notify the movable barrier operator 115 that charging has been completed and then in operation 1009 the movable barrier operator 115 may notify the access control platform server 101 that charging has been completed. Optionally, in operation 1010, the access control platform server 101 may notify the TaaS platform 130 that the autonomous vehicle 120 has been charged so that the TaaS platform 130 can reconcile billing.

Figure 11:
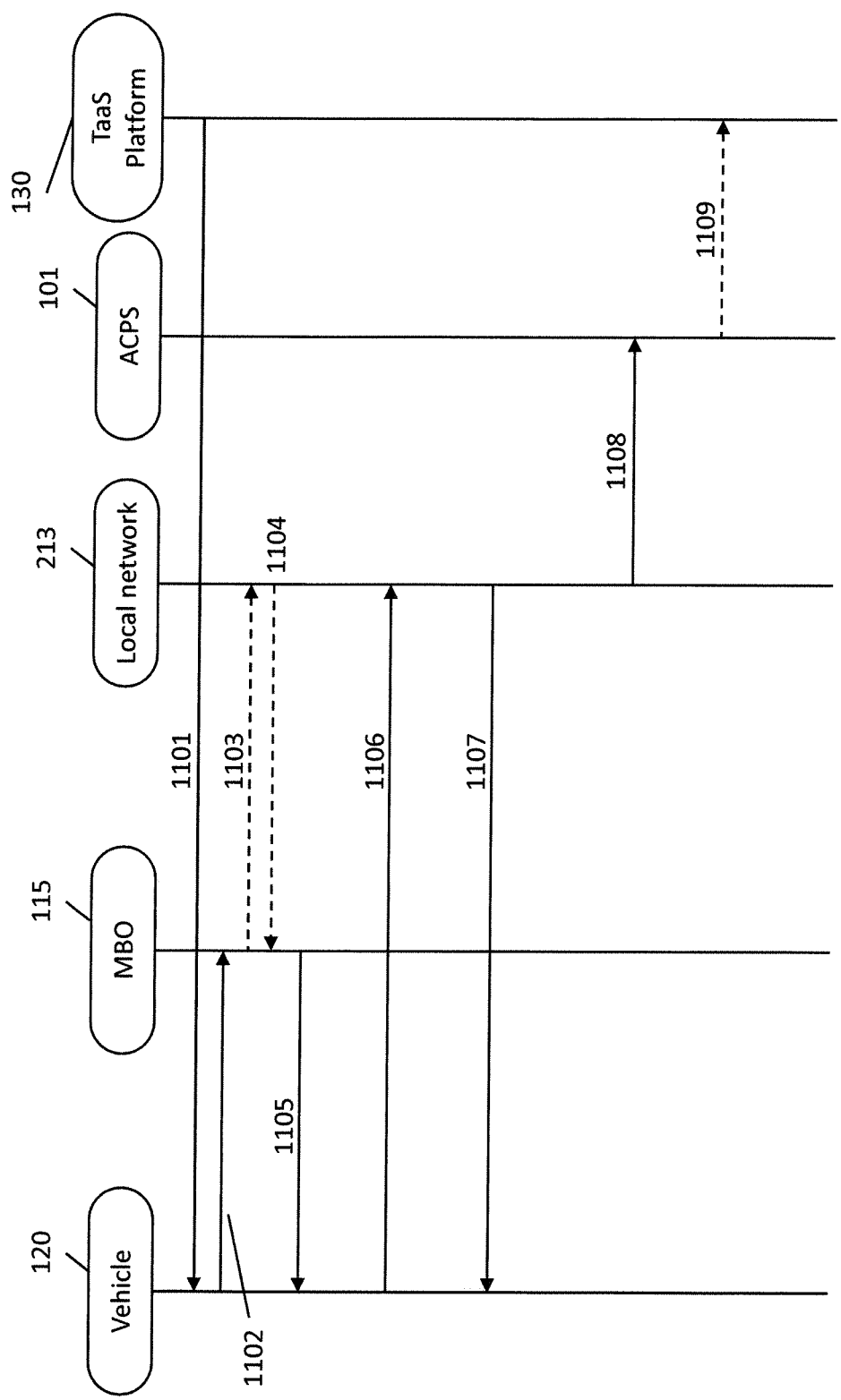
FIG. 11 illustrates a third example communication flow between the devices of the autonomous vehicle control system illustrated of FIG. 1.

FIG. 11 illustrates an example of a communication flow between the devices of the autonomous vehicle control system 1 illustrated in FIG. 1 to facilitate updating of the autonomous vehicle 120. In operation 1101, the TaaS platform 130 may send a notification to the autonomous vehicle 120 notifying the autonomous vehicle 120 that the autonomous vehicle 120 is to be updated and, after the autonomous vehicle 120 is parked in the vehicle storage area 15, in operation 1102 the autonomous vehicle 120 may communicate with the movable barrier operator ("MBO") 115 to request access credentials for a local network 213, such as a home WiFi network. Optionally, in operations 1103 and 1104, the movable barrier operator 115 (which may already be attached/connected to or otherwise associated with the local network 213) may communicate with a local network entity such as a modem, an access point, or a router to obtain temporary access credentials. Then, in operation 1105, the movable barrier operator 115 may transmit the temporary access credentials for the local network 213 to the autonomous vehicle 120 and in operation 1106 the autonomous vehicle 120 may connect to the local network 213. Additionally the movable barrier operator 115 may transmit in operation 1105 network information to the vehicle 120, for example the network name (e.g., service set identifier (SSID) of the wireless local area network) when the network is hidden/private or the name is not broadcast.

In operation 1107, the autonomous vehicle 120 may request, pull or otherwise download the pending updates. The updates may include but are not limited to: software and/or firmware (e.g., patches); infotainment media; navigation/map data; journey/trip scheduling information, as some examples. Alternatively, in operation 1107 the TaaS platform 130 may recognize that the autonomous vehicle 120 is on the local network 213 and push the pending updates to the vehicle. In operation 1108, the movable barrier operator 115 may communicate with the access control platform server 101 via the connection between the autonomous vehicle 120 and the TaaS platform 130. For example, the local network entity may communicate the connection time, the number of packets sent and received, or the total amount of data transferred. And, optionally, in operation 1109, the access control platform server 100 may notify the TaaS platform 130 of the use of the local network so that the TaaS platform 130 may reconcile billing.

While there have been illustrated and described particular embodiments, it will be appreciated that numerous changes and modifications will occur to those skilled in the art, and it is intended for the present disclosure to cover all those changes and modifications which fall within the scope of the appended claims. Although method operations may be presented and described herein in a sequential fashion, one or more of the operations shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A network computing device for facilitating operation of movable barrier operators by autonomous vehicles, the network computing device comprising:
   a communication interface operable to communicate with a plurality of autonomous vehicles and a plurality of movable barrier operators associated with a plurality of vehicle storage areas, the communication interface further operable to receive sensed environmental conditions of the plurality of vehicle storage areas;
   a memory to store information regarding the plurality of movable barrier operators and the sensed environmental conditions of the plurality of vehicle storage areas;
   a processor operably coupled to the communication interface and the memory, the processor configured to:

select a first vehicle storage area of the plurality of vehicle storage areas for a first autonomous vehicle of the plurality of autonomous vehicles based at least in part upon the sensed environmental conditions, the first vehicle storage area associated with a first movable barrier operator of the plurality of movable barrier operators; and cause the communication interface to communicate a temporary access credential to the first movable barrier operator to facilitate operation of the first movable barrier operator by the first autonomous vehicle and permit the first autonomous vehicle to access the first vehicle storage area.

2. The network computing device of claim 1, wherein the memory is further configured to store information regarding availability of the vehicle storage areas associated with the movable barrier operators, and wherein the processor is configured to select the first vehicle storage area for the first autonomous vehicle based at least in part upon the sensed environmental conditions and the availability of the first vehicle storage area associated with the first movable barrier operator.

3. The network computing device of claim 1, wherein the processor is further configured to obtain an expected arrival time of the first autonomous vehicle at the first vehicle storage area associated with the first movable barrier operator, wherein the temporary access credential is based at least in part upon the expected arrival time.

4. The network computing device of claim 1, wherein the processor is configured to utilize the sensed environmental conditions to perform a risk assessment of the plurality of vehicle storage areas; and
wherein the processor is configured to select the first vehicle storage area based at least in part upon the risk assessment.

5. The network computing device of claim 1, wherein the processor is configured to select the first vehicle storage area for the first autonomous vehicle based at least in part upon the sensed environmental conditions and a location of the first vehicle storage area relative to the first autonomous vehicle.

6. The network computing device of claim 1, wherein the temporary access credential includes a public key associated with the first autonomous vehicle.

7. The network computing device of claim 1, wherein the processor is further configured to cause the communication interface to communicate a second temporary access credential to the first autonomous vehicle, the second temporary access credential corresponding to the temporary access credential communicated to the first movable barrier operator.

8. The network computing device of claim 1, wherein the temporary access credential is derived from at least one of:
a vehicle identification number (VIN) specific to the first autonomous vehicle;
a media access control (MAC) address specific to the first autonomous vehicle; and
an internet protocol (IP) address specific to the first autonomous vehicle.

9. The network computing device of claim 1, wherein the processor is configured to facilitate communication of at least one of software updates and firmware updates to the first autonomous vehicle at the first vehicle storage area.

10. The network computing device of claim 1, wherein the processor is configured to facilitate charging of the first autonomous vehicle via a charger of the first vehicle storage area.

11. A non-transitory computer readable medium having instructions stored thereon that, when executed by a processor of a network computing device, cause performance of operations comprising:
communicating with a plurality of autonomous vehicles and a plurality of movable barrier operators, the plurality of movable barrier operators associated with a plurality of vehicle storage areas;
receiving sensed environmental conditions of the plurality of vehicle storage areas;
selecting a first vehicle storage area of the plurality of vehicle storage areas for a first autonomous vehicle of the plurality of autonomous vehicles based at least in part upon the sensed environmental conditions, the first vehicle storage area associated with a first movable barrier operator of the plurality of movable barrier operators; and
communicating a temporary access credential to the first movable barrier operator to facilitate operation of the first movable barrier operator by the first autonomous vehicle and permit the first autonomous vehicle to access the first vehicle storage area.

12. The non-transitory computer readable medium of claim 11, wherein selecting the first vehicle storage area for the first autonomous vehicle includes selecting the first vehicle storage area based at least in part upon the sensed environmental conditions and an availability of the first vehicle storage area for use by the first autonomous vehicle.

13. The non-transitory computer readable medium of claim 11, the operations further comprising:
obtaining an expected arrival time of the first autonomous vehicle at the first vehicle storage area; and
deriving the temporary access credential based at least in part upon the expected arrival time of the first autonomous vehicle.

14. The non-transitory computer readable medium of claim 11, the operations further comprising utilizing the sensed environmental conditions to perform a risk assessment of the plurality of vehicle storage areas; and
wherein selecting the first vehicle storage area for the first autonomous vehicle comprises selecting the first vehicle storage area based at least in part upon the risk assessment.

15. The non-transitory computer readable medium of claim 11 wherein selecting the first vehicle storage area for the first autonomous vehicle comprises selecting the first vehicle storage area based at least in part upon the sensed environmental conditions and a location of the first vehicle storage area relative to the first autonomous vehicle.

16. The non-transitory computer readable medium of claim 11, wherein the temporary access credential includes a public key associated with the first autonomous vehicle.

17. The non-transitory computer readable medium of claim 11, the operations further comprising communicating a second temporary access credential to the first autonomous vehicle, the second temporary access credential corresponding to the temporary access credential communicated to the first movable barrier operator.

18. The non-transitory computer readable medium of claim 11, wherein the temporary access credential is derived from at least one of:
a vehicle identification number (VIN) specific to the first autonomous vehicle;
a media access control (MAC) address specific to the first autonomous vehicle; and
an internet protocol (IP) address specific to the first autonomous vehicle.

19. The non-transitory computer readable medium of claim 11, the operations further comprising facilitating communication of at least one of software updates and firmware updates to the first autonomous vehicle at the first vehicle storage area.

20. The non-transitory computer readable medium of claim 11, the operations further comprising facilitating charging of the first autonomous vehicle via a charger of the first vehicle storage area.

* * * * *